United States Patent [19]

Bottomly

[11] Patent Number: 5,900,002
[45] Date of Patent: May 4, 1999

[54] METHOD AND APPARATUS FOR MANIPULATING PAGE LAYOUTS IN A DESKTOP PUBLISHING SYSTEM

[75] Inventor: Glenn D. Bottomly, Minneapolis, Minn.

[73] Assignee: Josten, Inc., Minneapolis, Minn.

[21] Appl. No.: 08/370,516

[22] Filed: Jan. 9, 1995

[51] Int. Cl.⁶ .................................................. G06F 7/00
[52] U.S. Cl. ...................... 707/517; 707/520; 707/539
[58] Field of Search ..................... 395/768, 769, 395/773, 774, 776, 777, 779, 780, 782, 785, 792, 802; 382/209, 284, 175, 176, 180; 707/507, 508, 512, 514, 513, 515, 517, 518, 520, 523, 539

[56] References Cited

U.S. PATENT DOCUMENTS

| | | | |
|---|---|---|---|
| 4,034,400 | 7/1977 | Owen et al. | 358/500 |
| 4,366,508 | 12/1982 | Crean et al. | 358/451 |
| 4,673,989 | 6/1987 | Yamada et al. | 358/450 |
| 4,679,095 | 7/1987 | Kitamura et al. | 358/515 |
| 4,775,886 | 10/1988 | Hirosawa | 358/528 |
| 4,949,188 | 8/1990 | Sato | 358/448 |
| 4,951,132 | 8/1990 | Nakade et al. | 358/524 |
| 5,101,282 | 3/1992 | Honma | 358/451 |
| 5,133,051 | 7/1992 | Handley | 395/776 |
| 5,140,676 | 8/1992 | Langelaan | 395/777 |
| 5,142,618 | 8/1992 | Fujiwara et al. | 395/778 |
| 5,157,516 | 10/1992 | Bachar | 358/451 |
| 5,161,029 | 11/1992 | Yamanishi | 358/296 |
| 5,170,467 | 12/1992 | Kubota et al. | 395/782 |
| 5,214,755 | 5/1993 | Mason | 395/782 |
| 5,293,475 | 3/1994 | Hennigan et al. | 395/779 |

OTHER PUBLICATIONS

Jostens, *Yeartech® Guide to Desktop Publishing Yearbooks*, manual, 1992.

Walsworth Publishing Company, *Desktop Guidelines—PageMaker Enhancements*, Jun. 1984, entire document.

*Primary Examiner*—Joseph R. Burwell
*Assistant Examiner*—Stephen Hong
*Attorney, Agent, or Firm*—Merchant, Gould, Smith, Edell, Welter, & Schmidt

[57] ABSTRACT

The present invention provides a method and apparatus for manipulating page layouts in a desktop publishing system. The present invention comprises an interactive computer-implemented productivity tool that is fast and easy to use and enhances the productivity of operators of the desktop publishing system. Once a two-page spread has been laid out on the monitor of the desktop publishing system, the present invention provides a number of different methods for manipulating the spreads.

18 Claims, 23 Drawing Sheets

Unconverted Fraction
Example: 35 235/350ths

FIG. 18A

Converted Fraction
Example: 35 $^{235}/_{350}$ ths

FIG. 18B 5,900,002

METHOD AND APPARATUS FOR MANIPULATING PAGE LAYOUTS IN A DESKTOP PUBLISHING SYSTEM

BACKGROUND OF THE INVENTION

1. Field of the Invention

This invention relates in general to computer-implemented desktop publishing systems, and in particular, to a method and apparatus for manipulating page layouts in a desktop publishing system.

2. Description of Related Art

In the current environment, yearbook publishers provide incentives to their customers to adopt technology that helps the publisher capitalize upon internal cost savings. For example, yearbook publishers tend to use industry-standard software, such as the ALDUS PAGEMAKER™ software and QUARK XPRESS™ software, to publish their yearbooks, rather than creating their own proprietary software. For this reason, yearbook technology products are becoming more of a commodity item. Yearbook publishers, therefore, seek to differentiate their products and services in a competitive marketplace by offering value-added tools that complement the industry-standard software.

These tools come in many forms. For example, the tools may comprise yearbook clip art libraries, or pre-designed yearbook spread (page layout) libraries, or outcome-based curriculums, etc. However, there is a need in the art for tools that allow customers to create and manipulate their yearbook pages more easily and more effectively.

SUMMARY OF THE INVENTION

To overcome the limitations in the prior art described above, and to overcome other limitations that will become apparent upon reading and understanding the present specification, the present invention discloses a method and apparatus for manipulating page layouts in a desktop publishing system. The present invention comprises an interactive computer-implemented productivity tool that is fast and easy to use and enhances the productivity of operators of the desktop publishing system. Once a two-page spread has been laid out on the monitor of the desktop publishing system, the present invention provides a number of different methods for manipulating the spreads. For example, the present invention provides functions for: (1) rotating two-page spreads 180° and then re-rotating the contents of individual objects; (2) horizontally reflecting two-page spreads about a horizontal center line and then re-rotating the contents of individual objects; (3) vertically reflecting two-page spreads about a vertical center line and then re-rotating the contents of individual objects; (4) mirroring one page onto an opposite page; (5) automatically generates a selected number of columns while maintaining page margins; (6) executing scripts for fixed templates in order to build two-page scripts; (7) mirroring one page of a fixed template onto an opposite page that has been erased; (8) mixing and matching opposing pages from two templates to create a custom two-page spread; and (9) converting fractions to a more accurate textual representation.

BRIEF DESCRIPTION OF THE DRAWINGS

Referring now to the drawings in which like reference numbers represent corresponding parts throughout:

FIG. 18A illustrates a text string containing a representation of a fraction in normal text;

FIG. 18B illustrates a reformatted version of the text string in FIG. 18A, wherein the fraction has been reformatted.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

Figure 1:
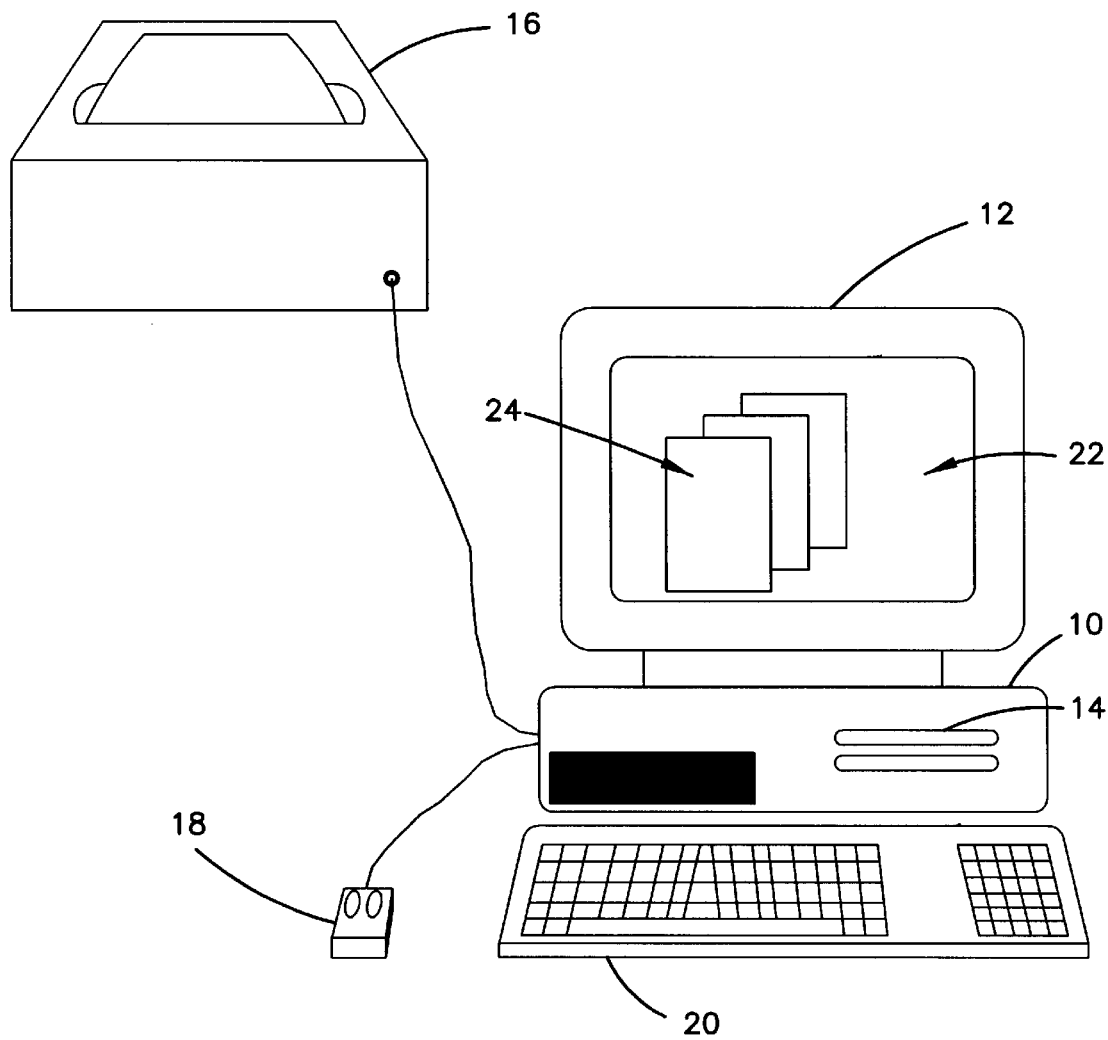
FIG. 1 illustrates one possible computer hardware and software embodiment of the present invention.

FIG. 1 illustrates one possible computer hardware and software embodiment of the present invention. The present invention comprises a computer-implemented desktop publishing system that assists a user through the process of manipulating page layouts. The present invention typically is implemented using a computer 10, and it is envisioned that attached to the computer 10 will be monitor 12, disk storage 14, and printer 16 peripherals. Also included in the preferred embodiment are input devices, for example, a mouse pointing device 18 and a keyboard 20. In addition, the computer 10 operates under the control of an operating system 22. The present invention itself is preferably a computer program 24 operating under control of the operating system 22. The present invention provides an interactive computer-implemented tool that is fast and easy to use, enhances the productivity of customers that use the desktop publishing systems to create yearbooks, provides a competitive advantage for publishers, and provides a cost effective way of doing business for publishers.

DESCRIPTION OF INTERNAL UTILITIES

Following is a description of each of the utilities or tools that comprise the present invention, along with a description of the benefits to the customer that derive from the present invention. These utilities currently work with Aldus PageMaker 5.0 for the Macintosh (using Applescript) and Windows (using Visual Basic), but those skilled in the art will recognize that they can be easily ported to other desktop publishing systems.

Figure 2:
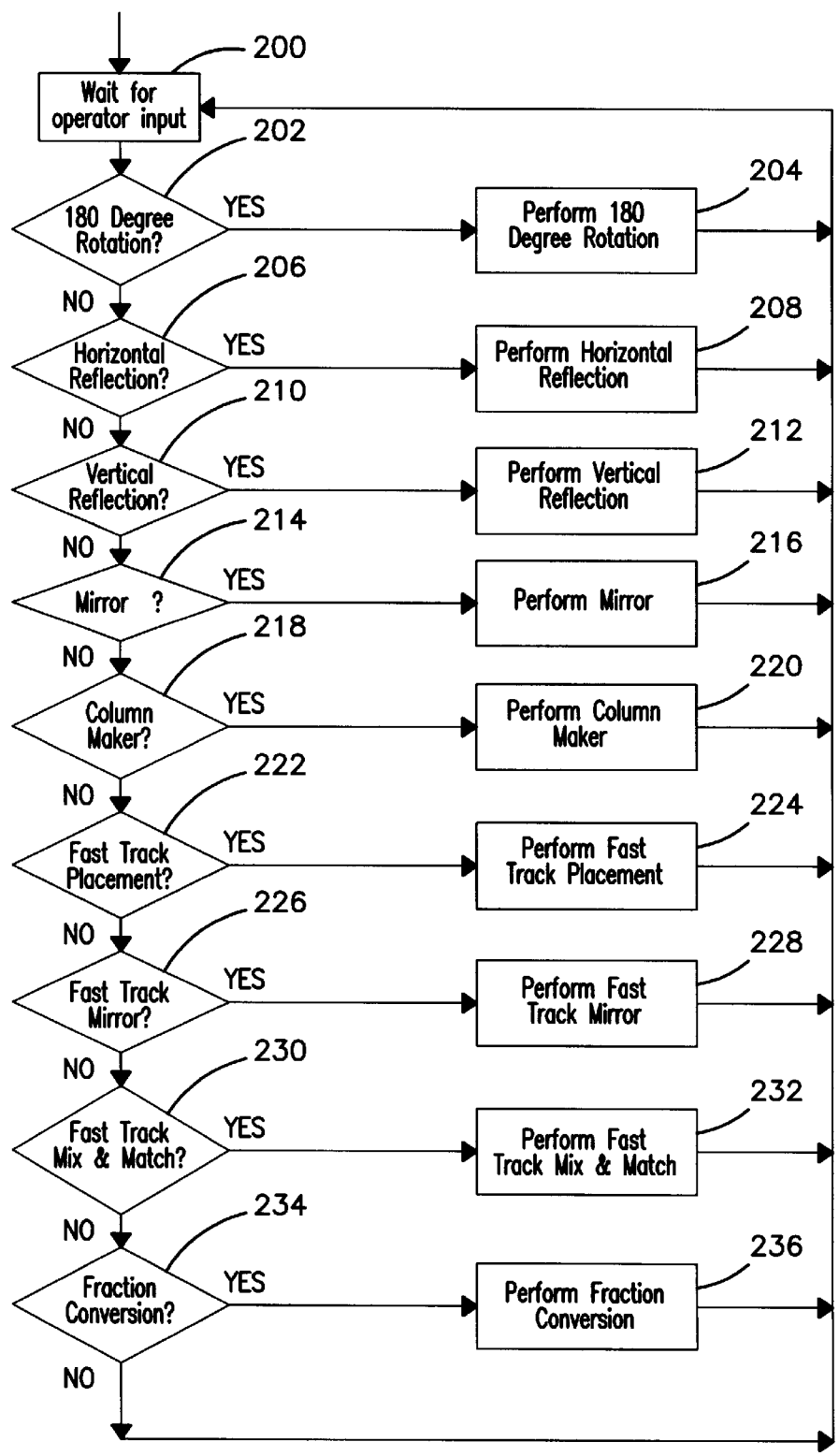
FIG. 2 is a flowchart more specifically illustrating the logic performed by the present invention.

FIG. 2 is a flowchart more specifically illustrating the logic performed by the present invention. Block 200 represents the system waiting for the entry of operator input.

Block 202 is a decision block determining whether the operator has invoked the 180 Degree Rotation utility. If so, control is transferred to block 204, which invokes the logic described in FIG. 4. Otherwise, control is transferred to block 206.

Block 206 is a decision block determining whether the operator has invoked the Horizontal Reflection utility. If so, control is transferred to block 208, which invokes the logic described in FIG. 6. Otherwise, control is transferred to block 210.

Block 210 is a decision block determining whether the operator has invoked the Vertical Reflection utility. If so, control is transferred to block 212, which invokes the logic described in FIG. 8. Otherwise, control is transferred to block 214.

Block 214 is a decision block determining whether the operator has invoked the Mirror utility. If so, control is transferred to block 216, which invokes the logic described in FIG. 10. Otherwise, control is transferred to block 218.

Block 218 is a decision block determining whether the operator has invoked the Column Maker utility. If so, control is transferred to block 220, which invokes the logic described in FIG. 12. Otherwise, control is transferred to block 222.

Block 222 is a decision block determining whether the operator has invoked the Fast Track Placement utility. If so, control is transferred to block 224, which invokes the logic described in FIG. 13. Otherwise, control is transferred to block 226.

Block 226 is a decision block determining whether the operator has invoked the Fast Track Mirror utility. If so, control is transferred to block 228, which invokes the logic described in FIG. 15. Otherwise, control is transferred to block 230.

Block 230 is a decision block determining whether the operator has invoked the Fast Track Mix And Match utility. If so, control is transferred to block 232, which invokes the logic described in FIG. 17. Otherwise, control is transferred to block 234.

Block 234 is a decision block determining whether the operator has invoked the Fraction Conversion utility. If so, control is transferred to block 236, which invokes the logic described in FIG. 19. Otherwise, control is transferred to block 200.

180 DEGREE ROTATION UTILITY

Figure 3A:
FIG. 3A illustrates a two-page spread.
Figure 3B:
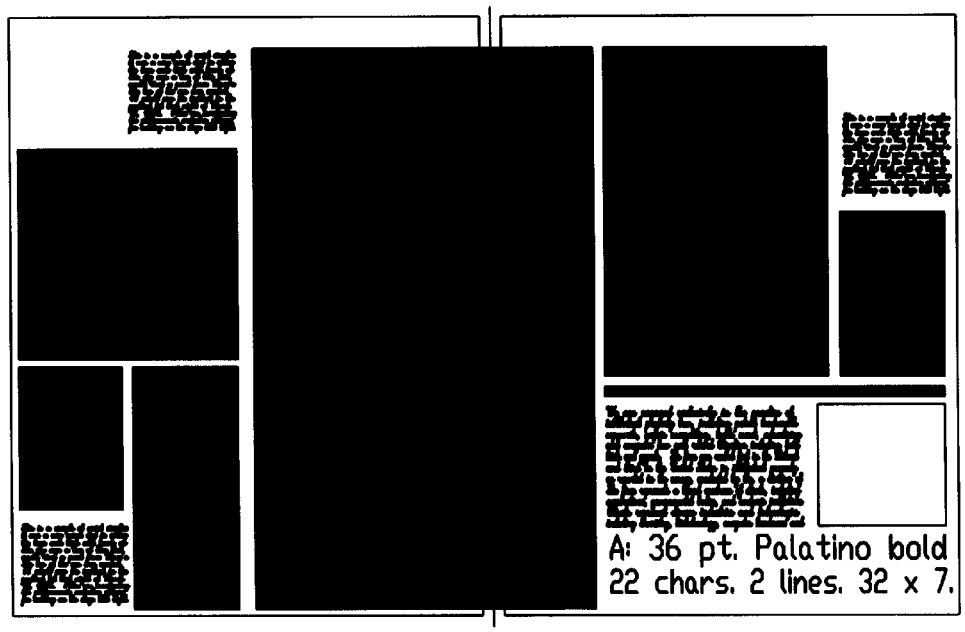
FIG. 3B illustrates a rotated version of the two-page spread in FIG. 3A, wherein the entire spread has been rotated 180 degrees about a center axis, yet each of the objects is correctly oriented.

The 180 Degree Rotation utility rotates two-page spreads by 180 degrees, and thereafter ensures that the individual objects are re-rotated so that they are correctly oriented. FIG. 3A illustrates a two-page spread comprised of graphics objects (in black), text objects, and picture objects (in white). FIG. 3B illustrates a rotated version of the two-page spread in FIG. 3A, wherein the entire spread has been rotated 180 degrees about a center axis, yet each of the objects is correctly oriented (as indicated by the text objects).

Figure 4:
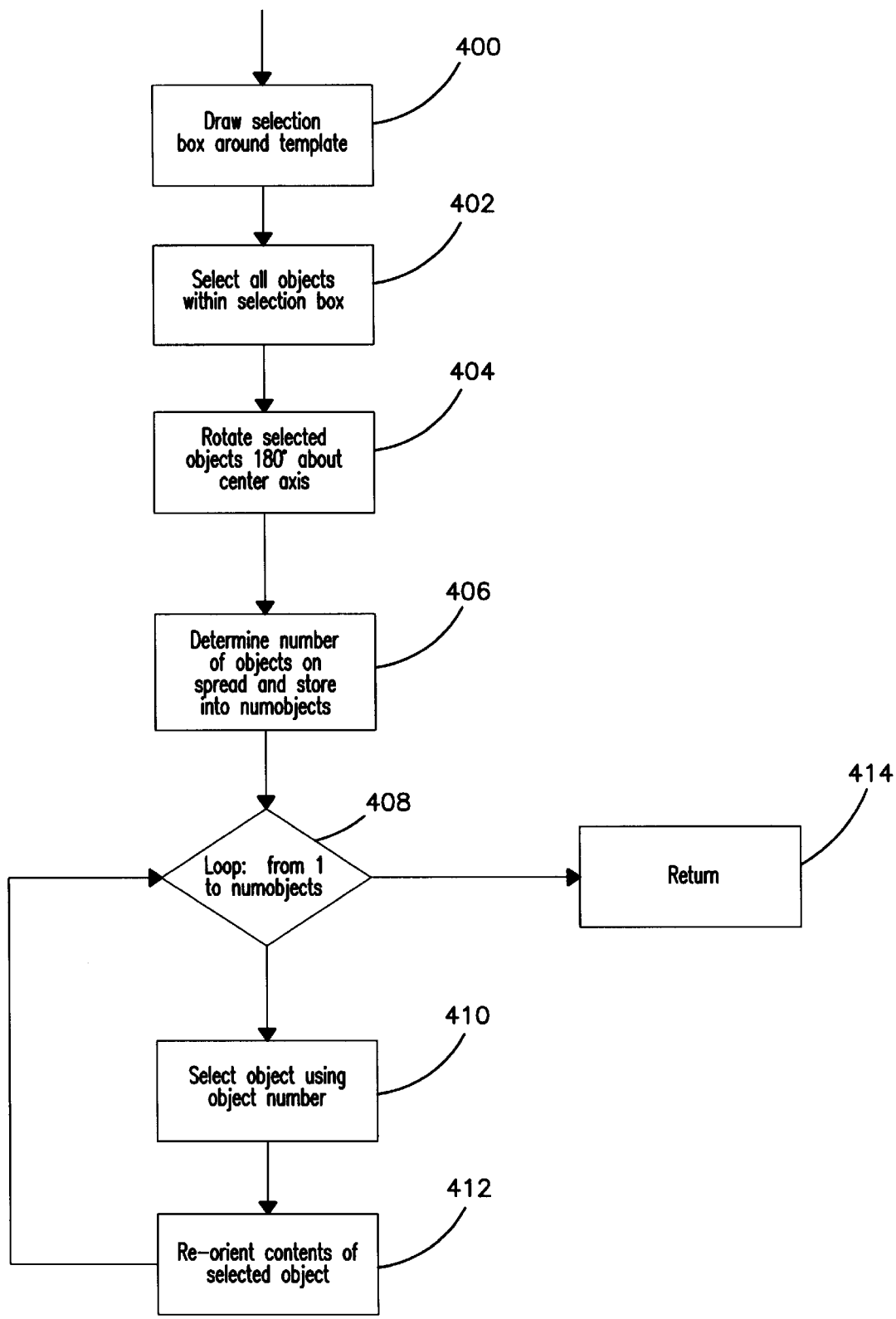
FIG. 4 is a flowchart that describes the logic of the 180 Degree Rotation utility according to the present invention.

FIG. 4 is a flowchart that describes the logic of the 180 Degree Rotation utility according to the present invention. Block 400 draws a selection block around the entire two-page spread currently displayed on the monitor. Block 402 selects all objects within the selection box, i.e., all objects on the two-page spread. Block 404 rotates the selection box 180 degrees about a center axis of the two-page spread. Block 406 determines how many objects are on the two-page spread. Blocks 408–414 form a sequential "for" loop that selects every object in the two-page spread individually, and then re-rotates the contents of the objects so that they are correctly oriented.

HORIZONTAL REFLECTION

Figure 5A:
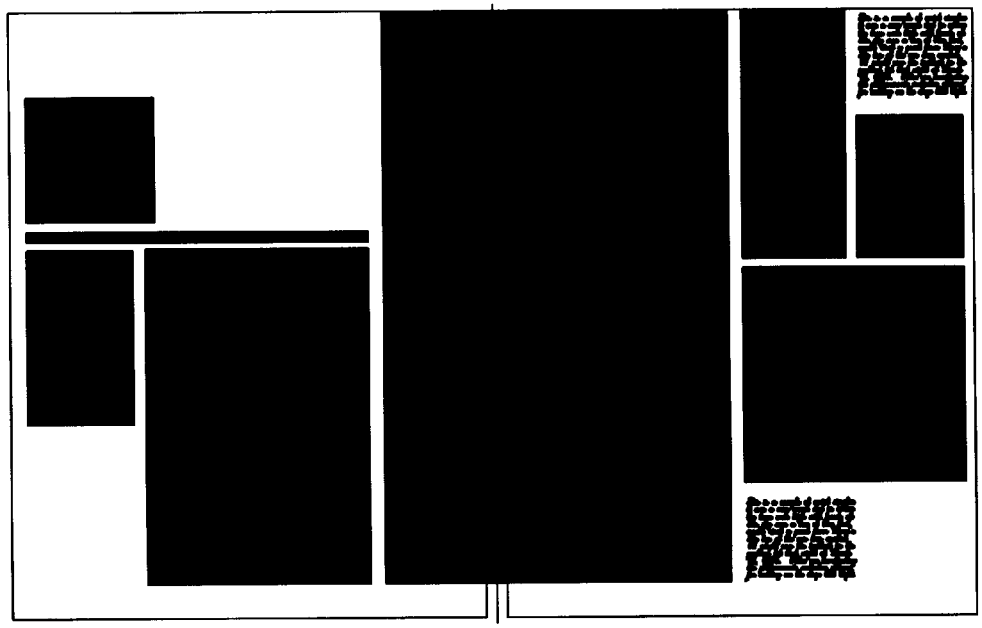
FIG. 5A illustrates a two-page spread.

Similar to the 180 Degree Rotation utility, this utility horizontally reflects two-page spreads, and thereafter ensures that the individual objects are re-rotated so that they are correctly oriented. FIG. 5A illustrates a two-page spread comprised of graphics objects (in black), text objects, and picture objects (in white).

Figure 5B:
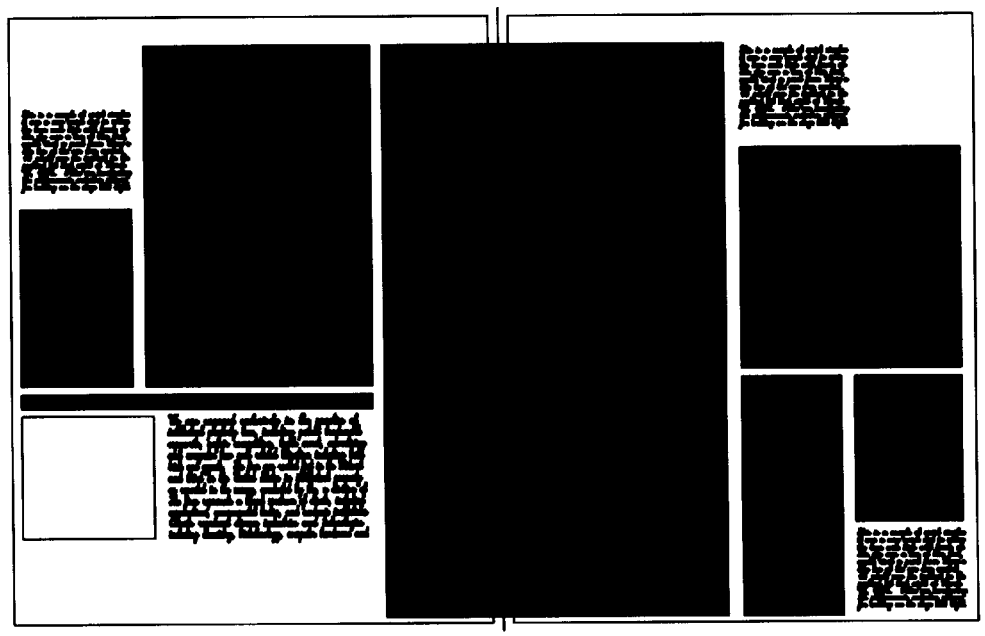
FIG. 5B illustrates a horizontally reflected version of the two-page spread in FIG. 5A, wherein the entire spread has been reflected about a horizontal center line, yet each of the objects is correctly oriented.

FIG. 5B illustrates a horizontally reflected version of the two-page spread in FIG. 5A, wherein the entire spread has been reflected about a horizontal center line (not shown), yet each of the objects is correctly oriented (as indicated by the text objects).

Figure 6:
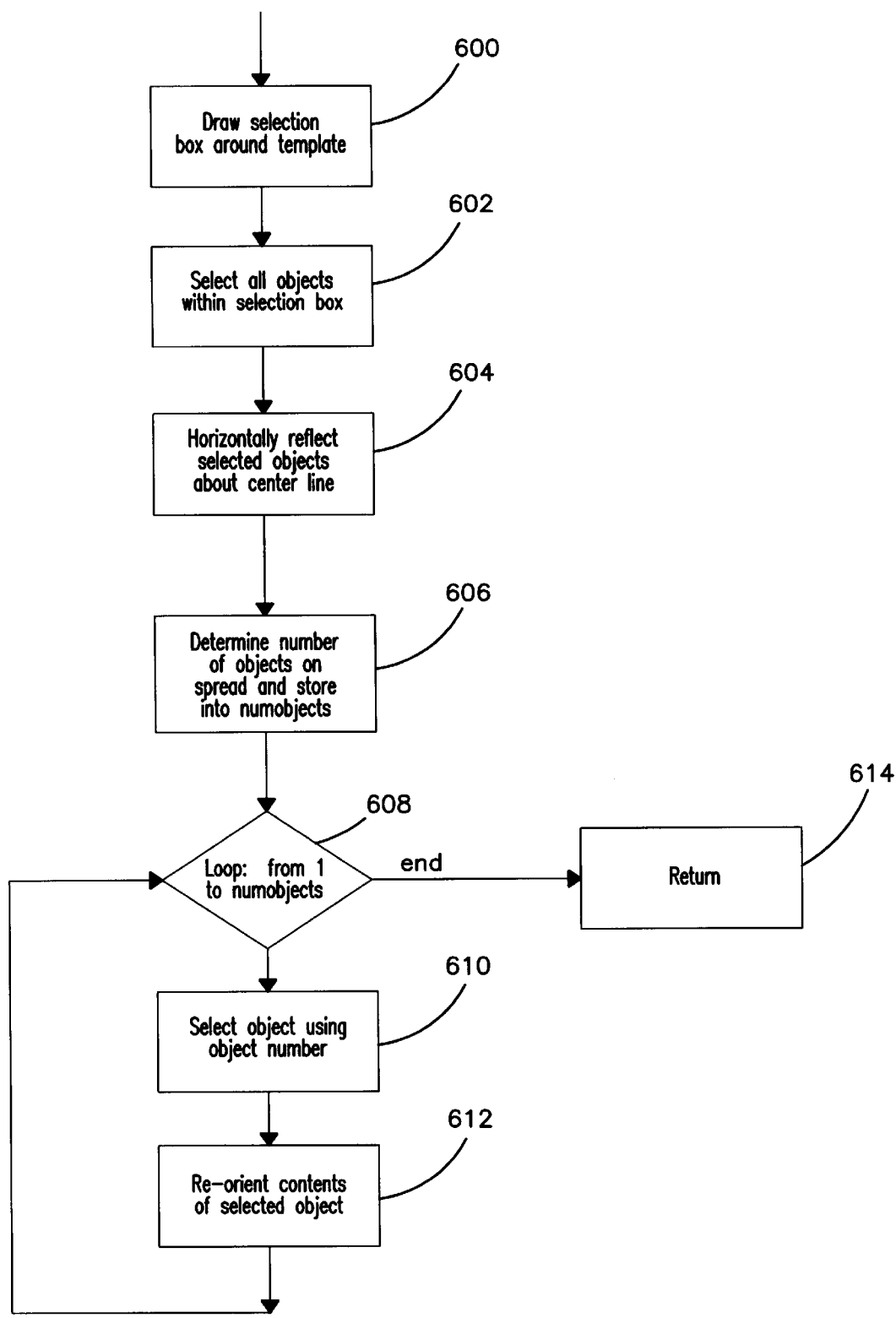
FIG. 6 is a flowchart that describes the logic of the Horizonal Reflection utility according to the present invention.

FIG. 6 is a flowchart that describes the logic of the Horizonal Reflection utility according to the present invention. Block 600 draws a selection block around the entire two-page spread currently displayed on the monitor. Block 602 selects all objects within the selection box, i.e., all objects on the two-page spread. Block 604 horizontally reflects the selection box about a horizontal center line of the two-page spread. Block 606 determines how many objects are on the two-page spread. Blocks 608–614 form a sequential "for" loop that selects every object in the two-page spread individually, and then re-rotates the contents of the objects so that they are correctly oriented.

VERTICAL REFLECTION

Figure 7A:
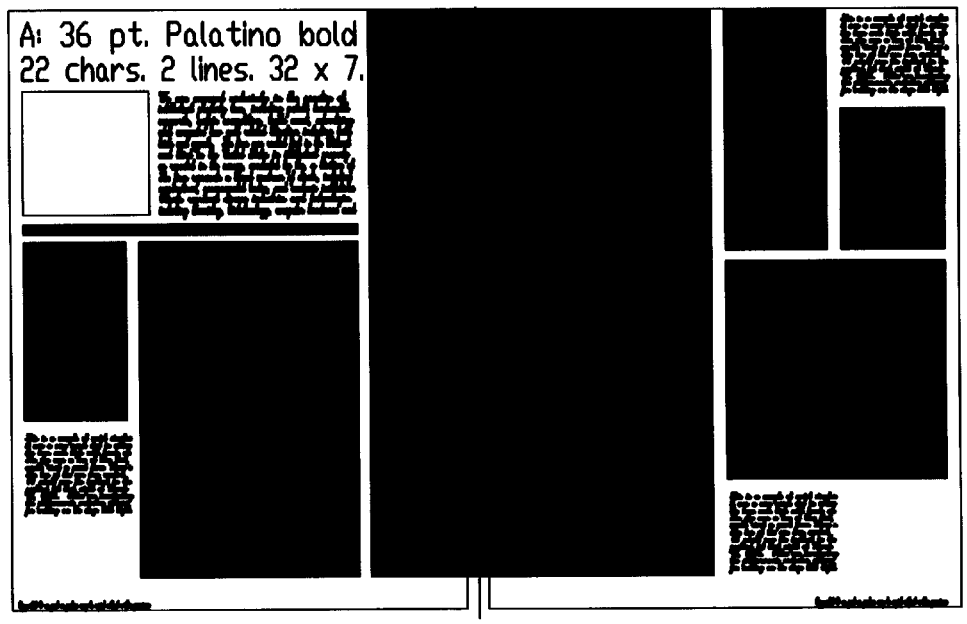
FIG. 7A illustrates a two-page spread.
Figure 7B:
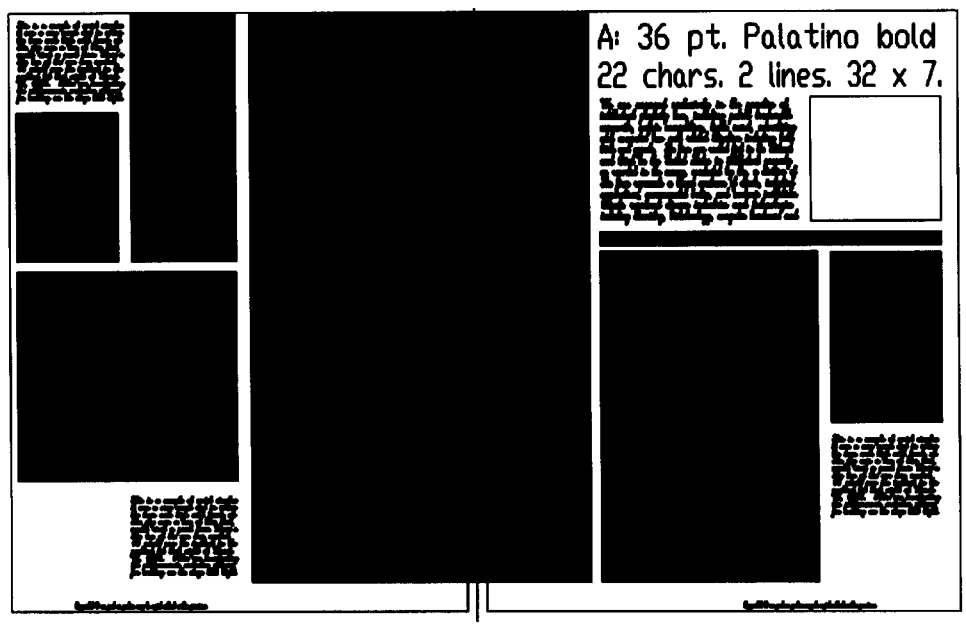
FIG. 7B illustrates a vertically reflected version of the two-page spread in FIG. 7A, wherein the entire spread has been reflected about a vertical center line, yet each of the objects is correctly oriented.

Similar to the Horizontal Reflection utility, this utility vertically reflects two-page spreads, and thereafter ensures that the individual objects are re-rotated so that they are correctly oriented. FIG. 7A illustrates a two-page spread comprised of graphics objects (in black), text objects, and picture objects (in white). FIG. 7B illustrates a vertically reflected version of the two-page spread in FIG. 7A, wherein the entire spread has been reflected about a vertical center line (not shown), i.e., the gutter, yet each of the objects is correctly oriented (as indicated by the text objects).

Figure 8:
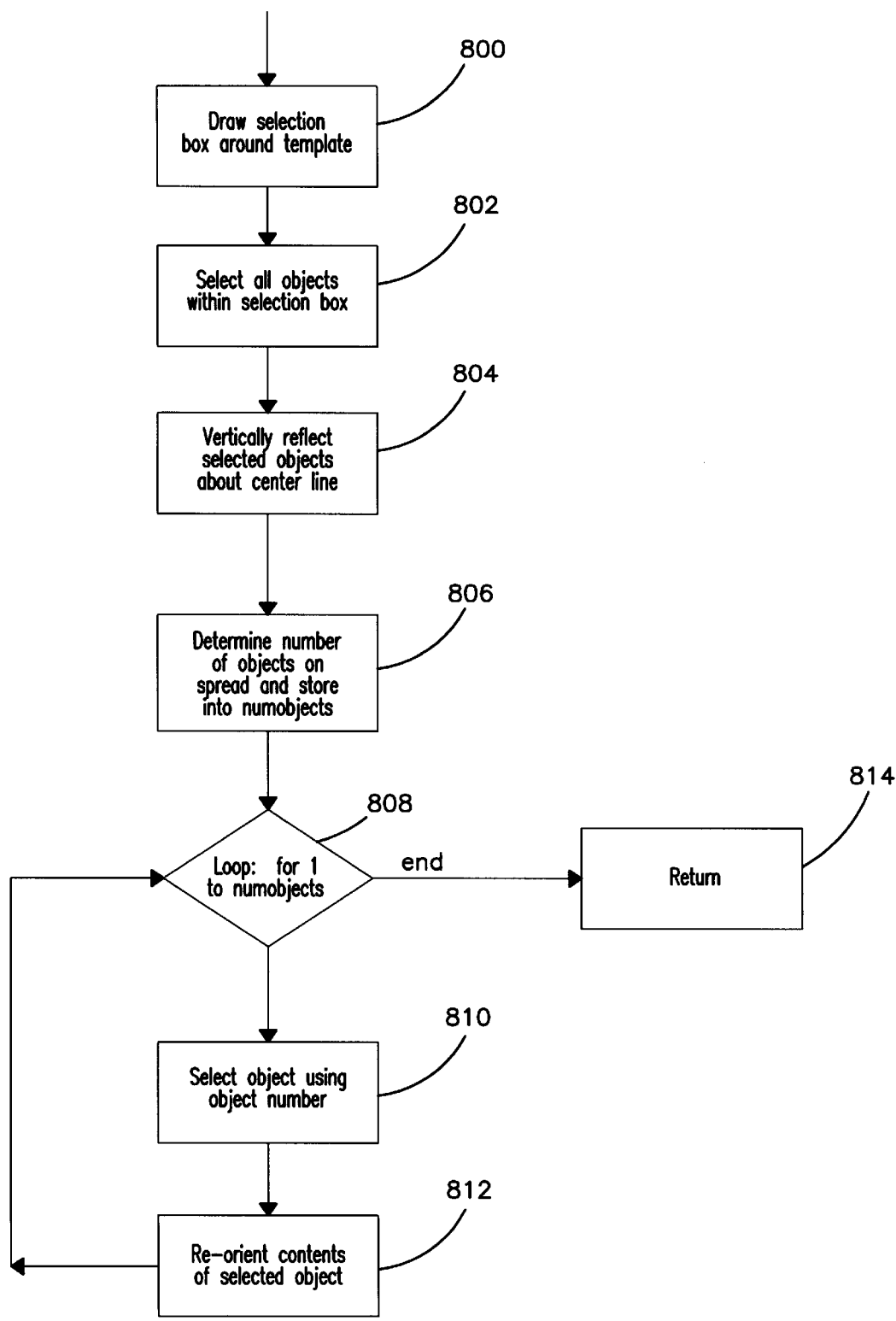
FIG. 8 is a flowchart that describes the logic of he Vertical Reflection utility according to the present invention.

FIG. 8 is a flowchart that describes the logic of the Vertical Reflection utility according to the present invention. Block 800 draws a selection block around the entire two-page spread currently displayed on the monitor. Block 802 selects all objects within the selection box, i.e., all objects on the two-page spread. Block 804 vertically reflects the selection box about a vertical center line of the two-page spread. Block 806 determines how many objects are on the two-page spread. Blocks 808–814 form a sequential "for" loop that selects every object in the two-page spread individually, and then re-rotates the contents of the objects so that they are correctly oriented.

MIRROR UTILITY

Figure 9A:
FIG. 9A illustrates a two-page spread.
Figure 9B:
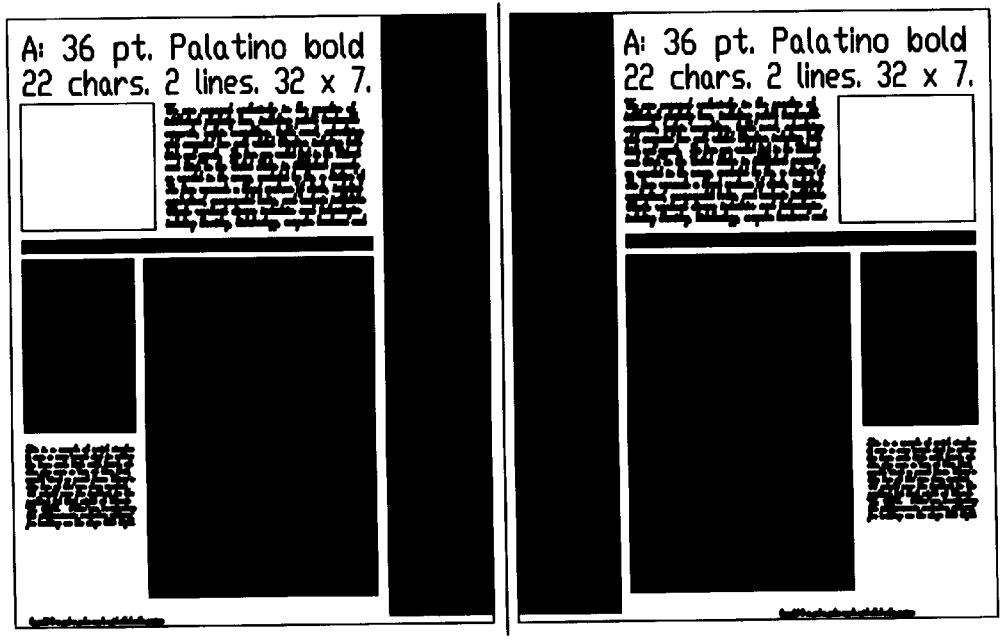
FIG. 9B illustrates a mirrored version of the two-page spread in FIG. 9A, wherein the right hand page has been erased and the left hand page has been copied onto the left hand page with identical placement of objects.

This utility selects and copies a single page of a two-page spread onto an opposite page to create a mirror image of the selected page. FIG. 9A illustrates a two-page spread comprised of graphics objects (in black), text objects, and picture objects (in white), wherein the right hand page has been erased. FIG. 9B illustrates a mirrored version of the two-page spread in FIG. 9A, wherein the left hand page has been copied onto the right hand page with identical placement of objects.

Figure 10A:
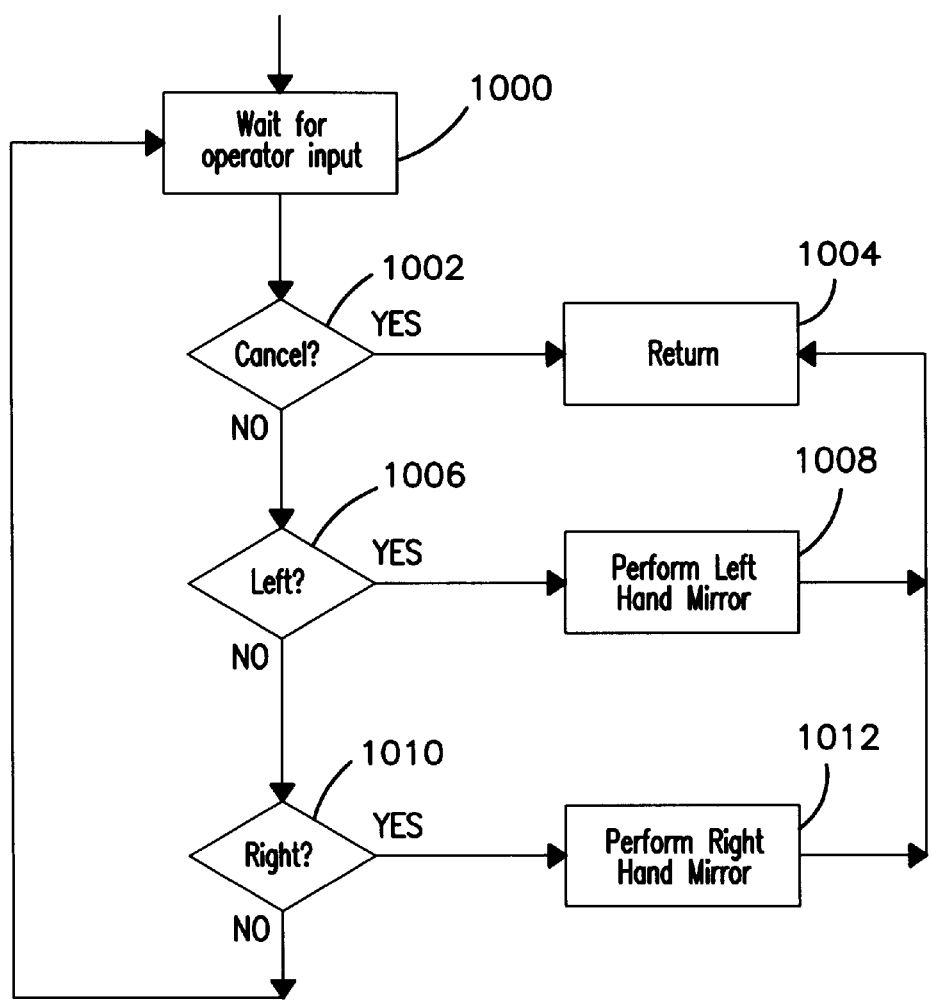
FIGS. 10A, 10B, and 10C together are a flowchart that describes the logic of the Mirror utility according to the present invention.

FIG. 10 is a flowchart that describes the logic of the Mirror utility according to the present invention. Block 1000 waits for operator input into the computer system. When such input is received, control is transferred to block 1002.

Block 1002 is a decision block that determines whether the operator has entered a "cancel" command. If so, control is transferred to block 1004, which terminates the utility and returns to FIG. 2. Otherwise, control is transferred to block 1006.

Block 1006 is a decision block that determines whether the operator has entered a "left" command. If so, control is transferred to block 1008, which performs the left hand mirror function as described in FIG. 10B. Otherwise, control is transferred to block 1010.

Block 1010 is a decision block that determines whether the operator has entered a "right" command. If so, control is transferred to block 1012, which performs the right hand mirror function described in FIG. 10C. Otherwise, control is transferred to block 1000 to wait for further operator input.

Figure 10B:
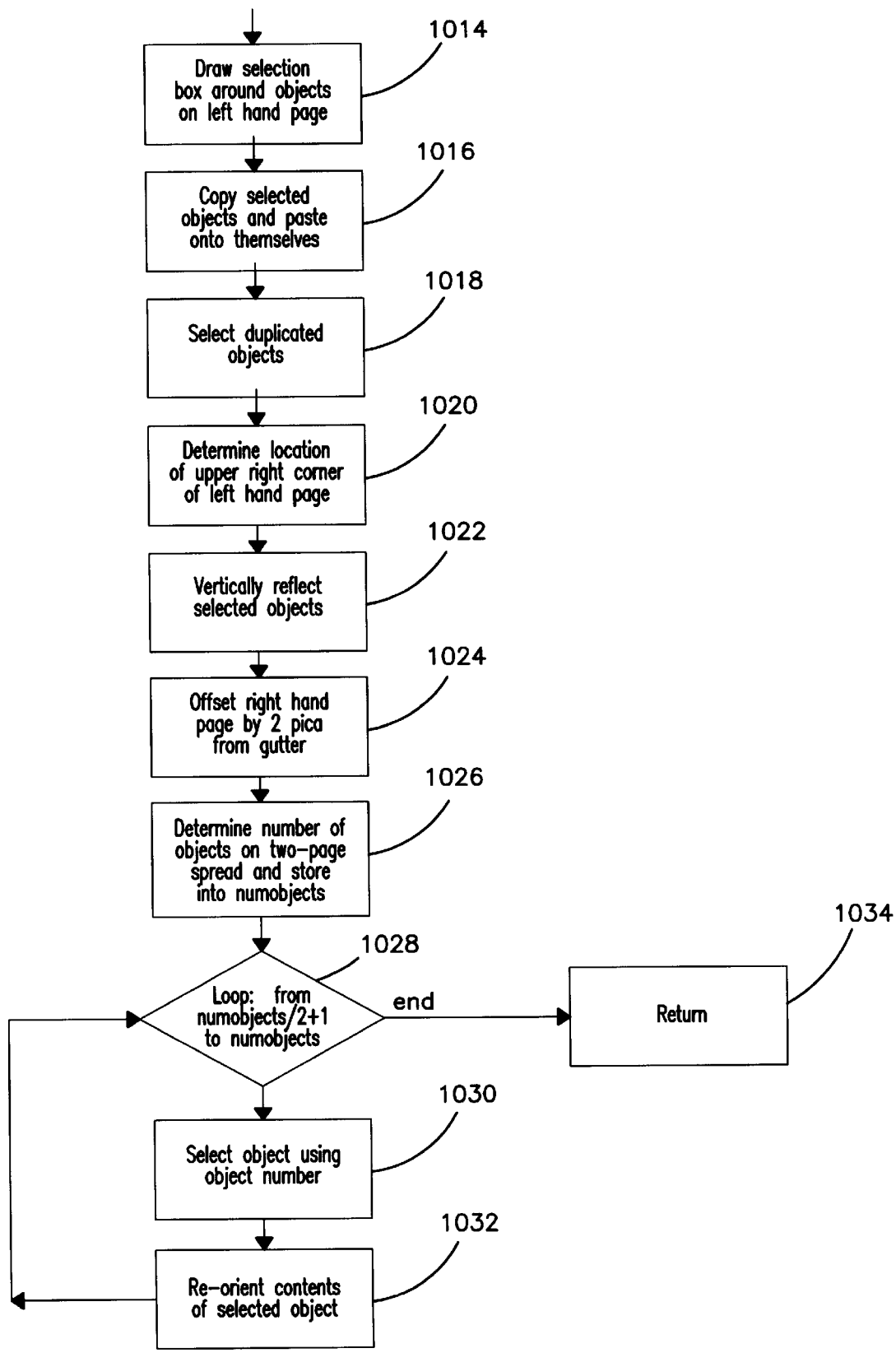
Figure 10C:
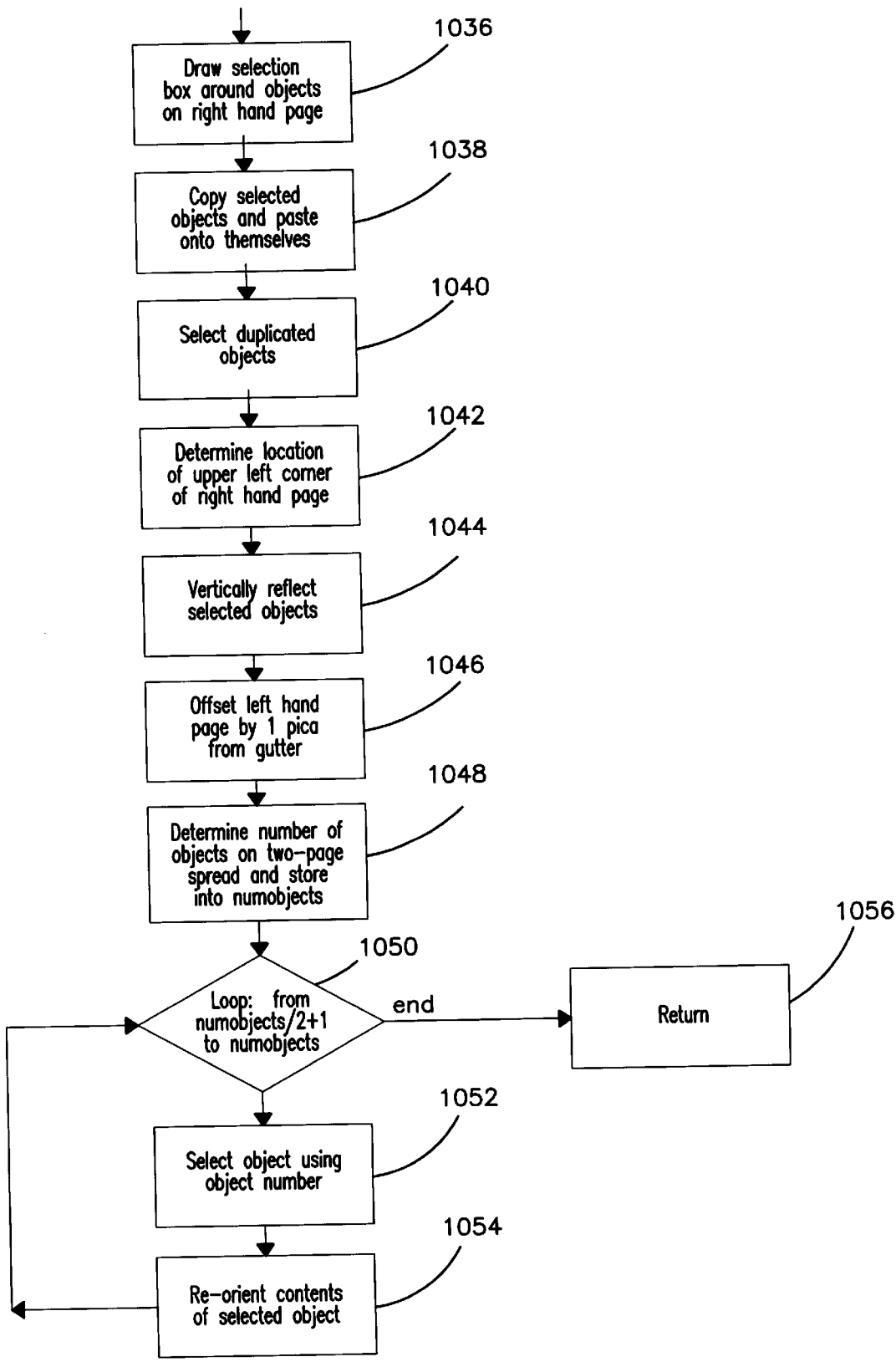

Referring now to FIG. 10B, which describes the steps performed when a "left" command is entered by the operator. Block 1014 draws a selection box around the left hand side of the two-page spread and selects all the objects on the left hand side of the two-page spread. Block 1016 copies all the objects on the left hand page, and then pastes the copied objects on top of the original objects, thereby resulting in two versions of the same left hand page being superimposed on one another. Block 1018 selects the duplicated objects on the left hand page, and block 1020 determines the location of the upper right corner of the left hand page. Block 1022 reflects the duplicated page elements to the right hand side of the two-page spread, which reflection is performed about the upper right hand corner of the left hand page. Block 1024 selects all the objects of the right hand page, and moves them in unison, so that the edge of the right hand page is offset one pica to the right of the gutter.

Block 1026 determines the total number of objects on the two-page spread and stores the number into the variable "numobjects." Blocks 1028–1034 represent a sequential "for" loop that individually selects every object in the duplicated right hand side of the two-page spread, and then re-rotates the contents of the objects, so that they are correctly oriented. Block 1028 begins at numobjects/2+1, which is the middle of the object count. For example, if there were originally ten objects on the left hand side of the two-page spread, then after duplication there are 20 objects on the two-page spread, and the reflection should begin at object #11, which is the first object on the right and side of the two-page spread.

COLUMN MAKER

Figure 11A:
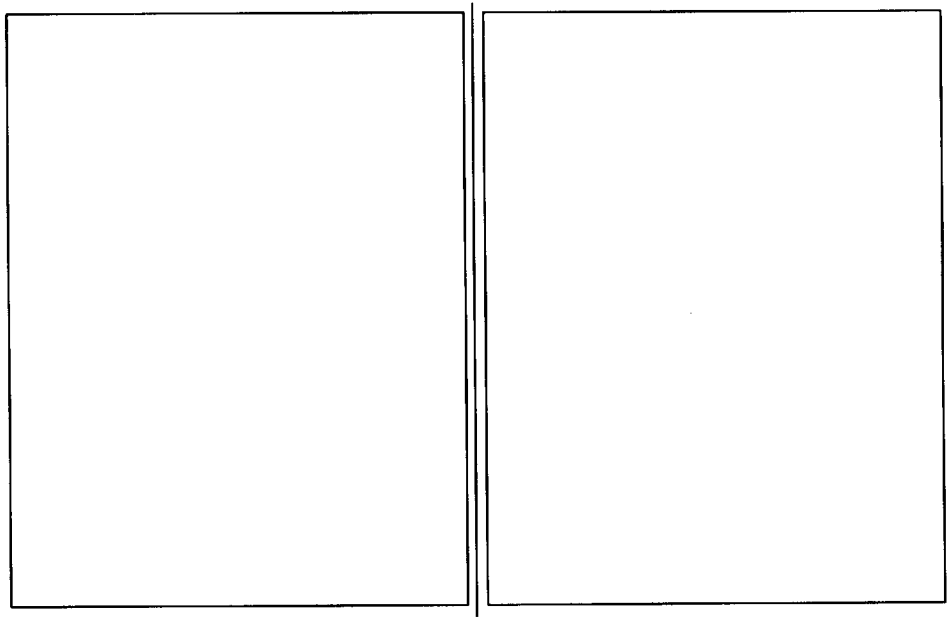
FIG. 11A illustrates a two-page spread.
Figure 11B:
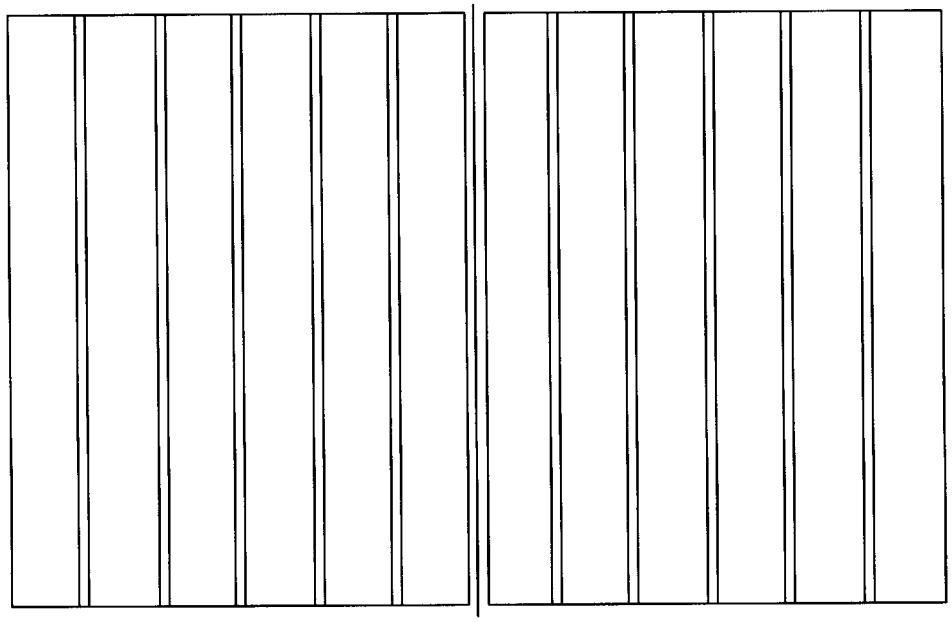
FIG. 11B illustrates a formatted version of the two-page spread in FIG. 11A, wherein columns have been added to both pages with the correct format, including a 1 pica offset on either side of the gutter and specified margins depending on the size of the yearbook.

While industry-standard desktop publishing software normally does have a column making command, it does not match the layout used in yearbooks, because the yearbook gets stitched in the center, also known as the gutter, there is a one pica offset on either side of the gutter, and there are specified margins depending on the size of the yearbook. Rather than sending the customers a number of different templates, the Column Maker utility formats a single template correctly. FIG. 11A illustrates a two-page spread comprised of blank pages. FIG. 11B illustrates a formatted version of the two-page spread in FIG. 11A, wherein columns have been added to both pages with the correct format, including a one pica offset on either side of the gutter and specified margins depending on the size of the yearbook.

Figure 12:
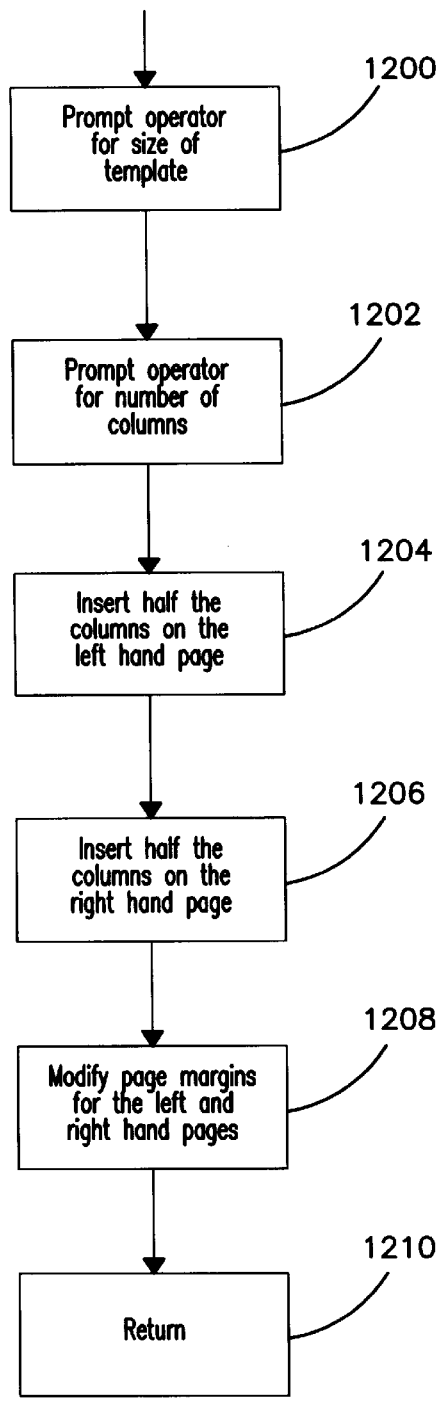
FIG. 12 is a flowchart that describes the logic of the Column Maker utility according to the present invention.

FIG. 12 is a flowchart that describes the logic of the Column Maker utility according to the present invention. Block 1200 prompts the operator for the size of the template. Block 1202 prompts the operator for entry of the number of columns to insert into the template. Blocks 1204 and 1206 insert the columns, half on one page and half on the other, depending upon the number of columns selected and the size of the yearbook. Block 1208 modifies the page margins depending on the number of the columns selected. Block 1210 terminates the utility and returns to FIG. 2.

FAST TRACK PLACEMENT

Figure 13:
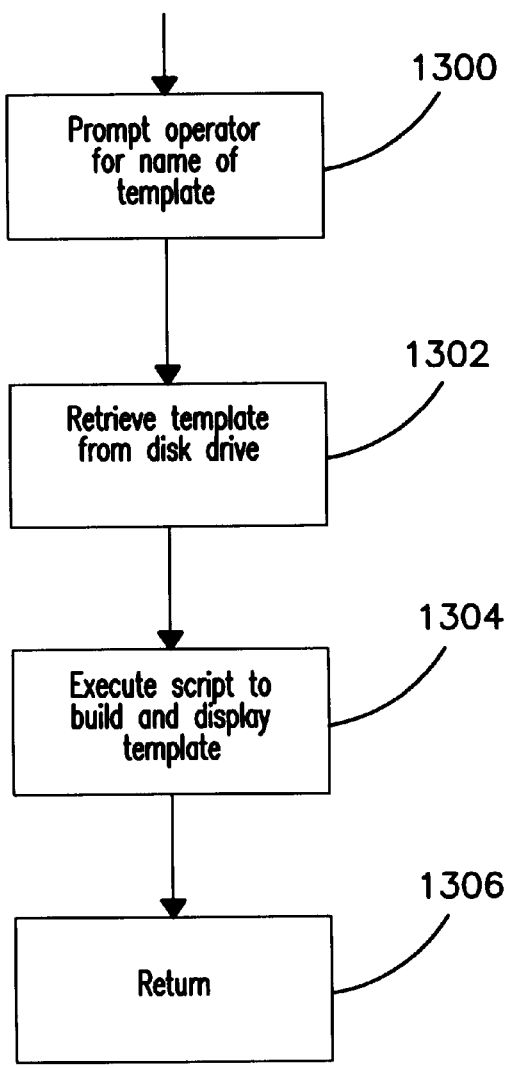
FIG. 13 is a flowchart that describes the logic of the Fast Track Placement utility according to the present invention.

Rather than sending the customers a large number of disks containing different templates, the Fast Track Placement utility builds and formats all predesigned templates from a single disk. FIG. 13 is a flowchart that describes the logic of the Fast Track Placement utility according to the present invention. Block 1300 prompts the operator for the desired template name. Block 1302 retrieves the template script from a secondary storage device, i.e., from disk drive 14. Block 1304 then executes the script to build and display the two-page spread from the template. Block 1306 terminates the utility and returns to FIG. 2.

FAST TRACK MIRROR

The Fast Track Mirror utility allows a customer to take any Fast Track Template, choose which side they want to retain, and then generate a mirror image of it on the opposite page. This function is nearly identical to the Mirror utility described above, but it includes the extra steps of the "Fast Track Placement" utility for selecting and displaying a two-page spread from a stored template, erasing a selected one of the pages, and then mirroring the remaining page onto the erased page.

Figure 14A:
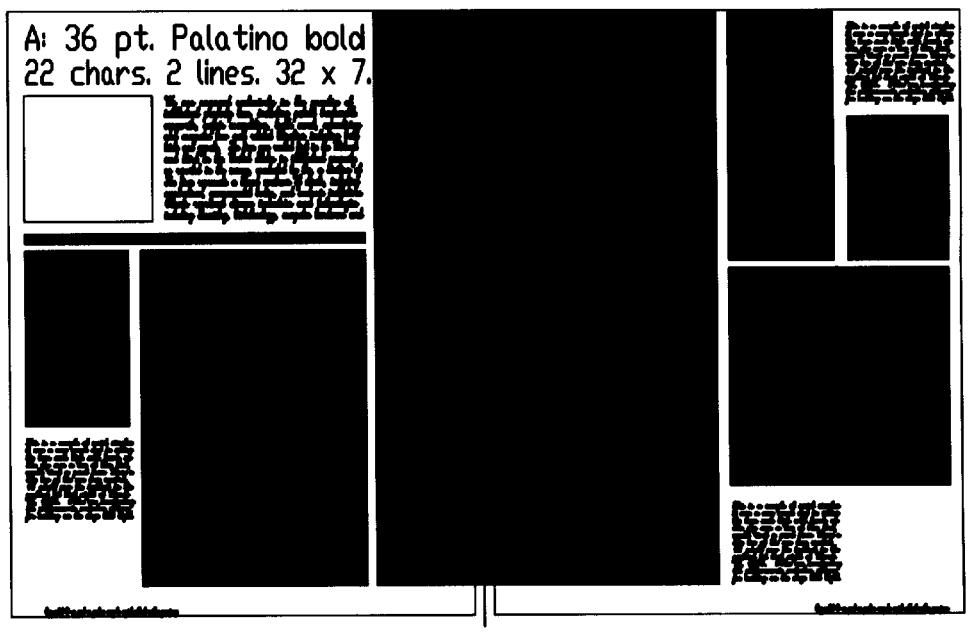
FIG. 14A illustrates a Fast Track template comprised of two-page spread.
Figure 14B:
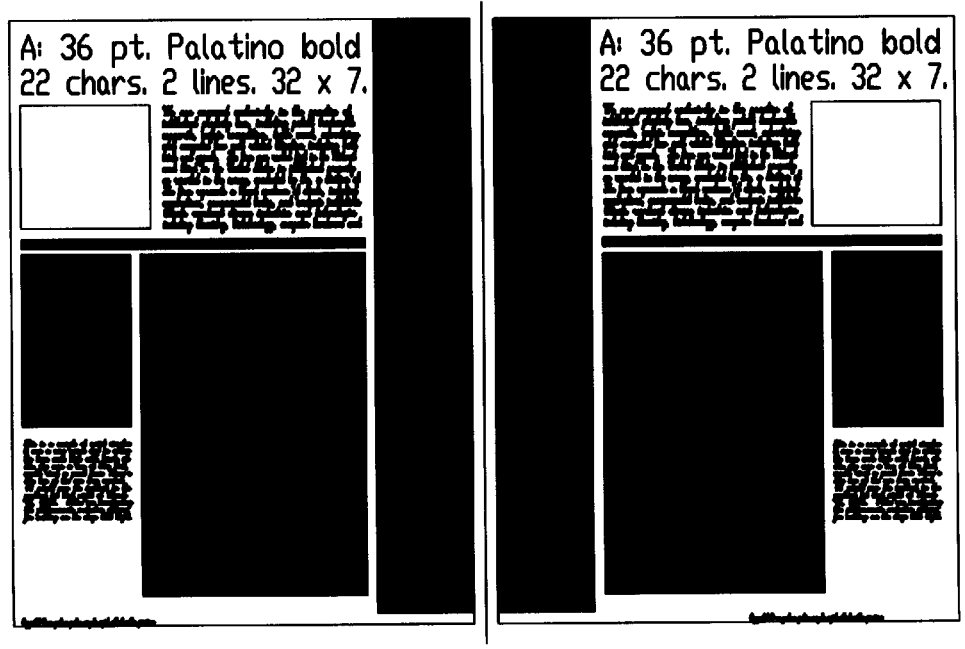
FIG. 14B illustrates a reformatted version of the two-page spread in FIG. 14A, wherein the right hand page has been erased and replaced with a mirror copy of the left hand page.

FIG. 14A illustrates a Fast Track template comprised of two-page spread, wherein the two-page spread is comprised of graphics objects (in black), text objects, and picture objects (in white). FIG. 14B illustrates a reformatted version of the two-page spread in FIG. 14A, wherein the right hand page has been erased and replaced with a mirror copy of the left hand page.

Figure 15A:
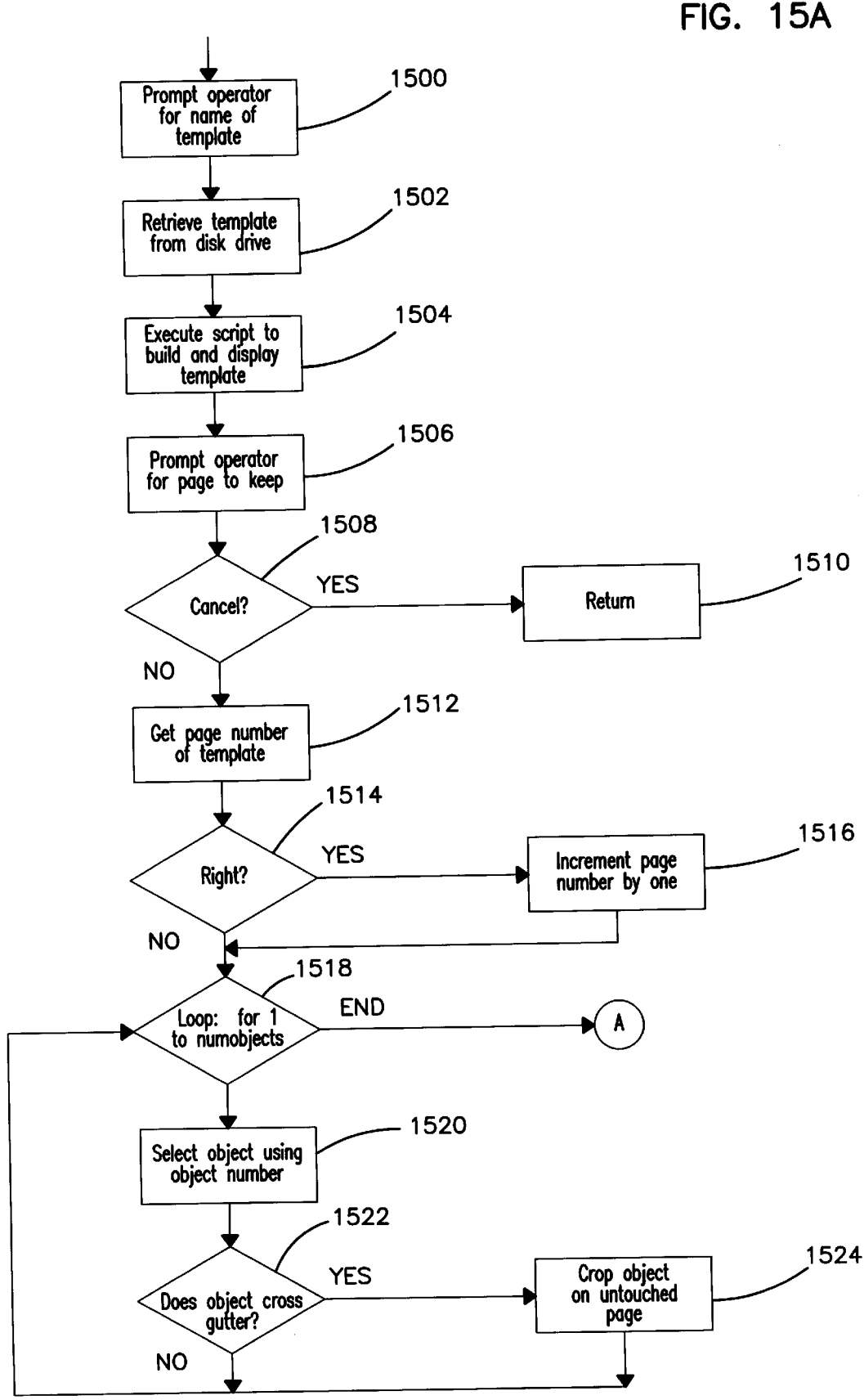
FIGS. 15A, 15B, and 15C together are a flowchart that describes the logic of the Fast Track Mirror utility according to the present invention.
Figure 15B:
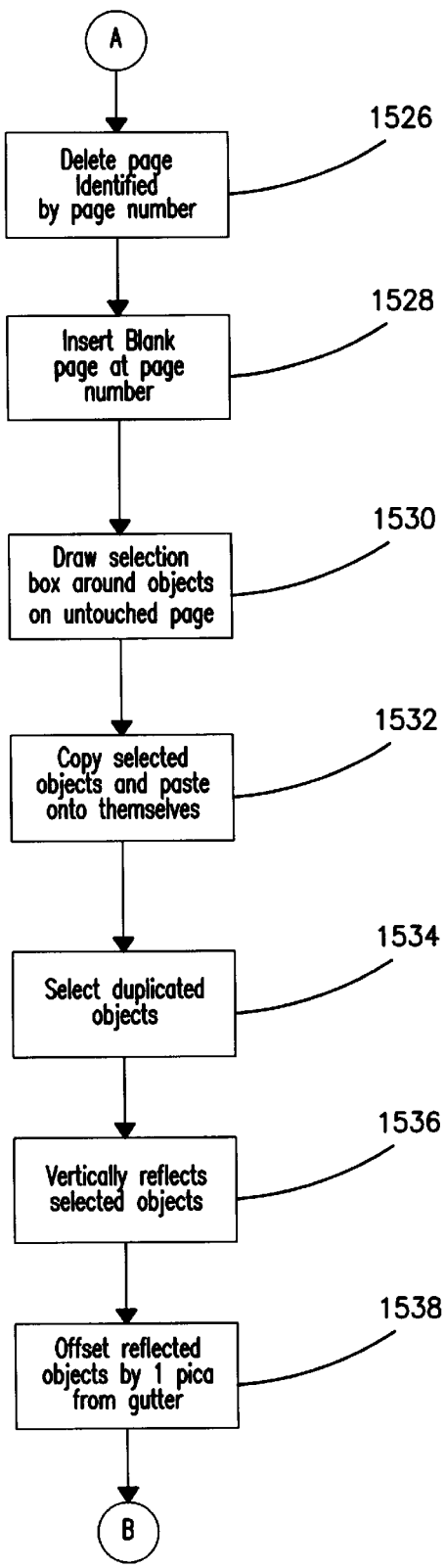
Figure 15C:
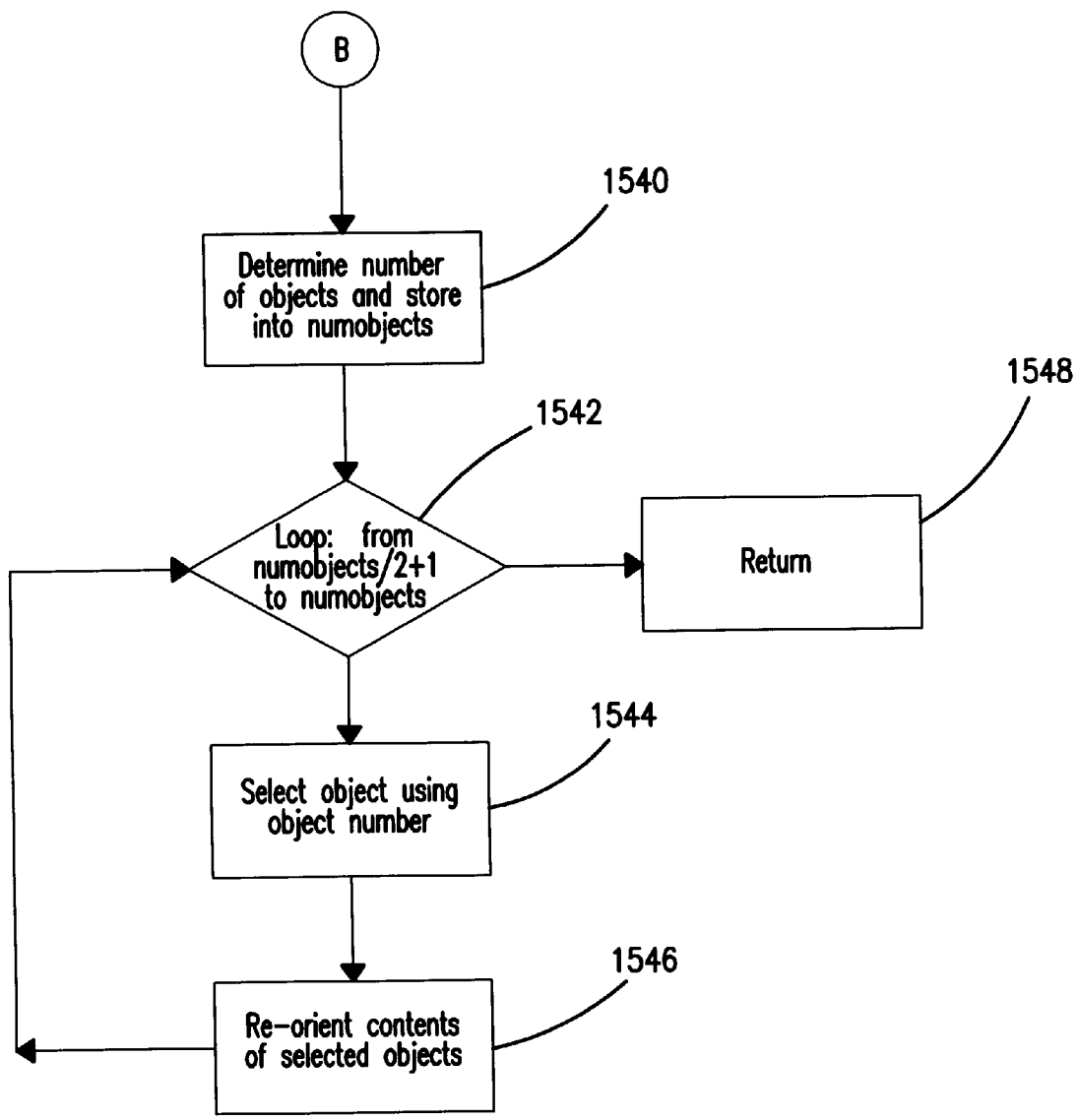

FIG. 15 is a flowchart that describes the logic of the Fast Track Mirror utility according to the present invention. Block 1500 prompts the operator for the desired template name. Block 1502 retrieves the template script from a secondary storage device, i.e., from disk drive 14. Block 1504 then executes the script to build and display the two-page spread from the template.

Block 1506 prompts the operator to enter a command indicating "left", "right", or "cancel". If "left" or "right" is entered by the operator, then this indicates which page, left or right, to keep, and thus implicitly identifies which page to erase, right or left.

Block 1508 is a decision block that determines whether the operator entered a "cancel" command. If so, control is transferred to block 1510, which terminates the utility and returns to FIG. 2. Otherwise, control is transferred to block 1512.

Block 1512 determines the page number of the two-page spread, which is the left hand page or odd page number of the two-page spread.

Block 1514 is a decision block that determines whether a "right" command was entered by the operator. If so, control is transferred to block 1516, which increments the page number by one to identify the right hand page of the two-page spread. Otherwise, control is transferred to block 1518.

Block 1518 is a decision block that comprises a sequential "for" loop that examines every object in the two-page spread. Block 1520 selects the object using the current object number from the "for" loop. Block 1522 is a decision block that determines whether the currently selected object crosses the gutter between the two pages of the spread. If so, control is transferred to block 1521, which resizes or crops the object, so that the object ends one pica away from the gutter on the page to be left untouched. After all objects have been examined, control is transferred from block 1518 to block 1526 in FIG. 15B via "A".

Block 1526 deletes the page identified by the page number, and block 1528 inserts a new page at the same page number position, i.e., a new page that is blank. Block 1530 draws a selection box around the objects on the untouched page and then selects all of the objects. Block 1532 copies all of the objects on the untouched page, duplicating them, and then pastes the copied objects on top of themselves, thereby resulting in two versions of the same page being superimposed on one another. Block 1534 selects the duplicated page elements, and block 1536 reflects the duplicated page elements to the blank page of the two-page spread, which reflection is performed from the upper left or right hand corner, depending on whether the blank page is on the right or left side of the two-page spread. Block 1538 selects all the objects of the new page, and moves them in unison, so that the edge of the new page is offset one pica from the gutter. Control is then transferred to block 1540 in FIG. 15C via "C".

Block 1540 determines the total number of objects on the two-page spread, and stores that value into the variable "numobjects". Blocks 1542–1548 represent a sequential "for" loop that individually selects every object on the duplicated page and rotates the contents of the selected object, so that it is correctly oriented. Block 1542 starts the loop at numobjects/2+1, which is the middle of the object count. For example, if there were originally 10 objects on the left hand side, then after the duplication there are 20 objects on the two-page spread, and the reflection begins at object #11, which is the first object on the duplicated page. Thus, only the objects on the duplicated page are rotated back to the correct orientation and the objects on the untouched page are left alone. The final block 1548 terminates the utility and returns to FIG. 2.

FAST TRACK MIX AND MATCH

Figure 16A:
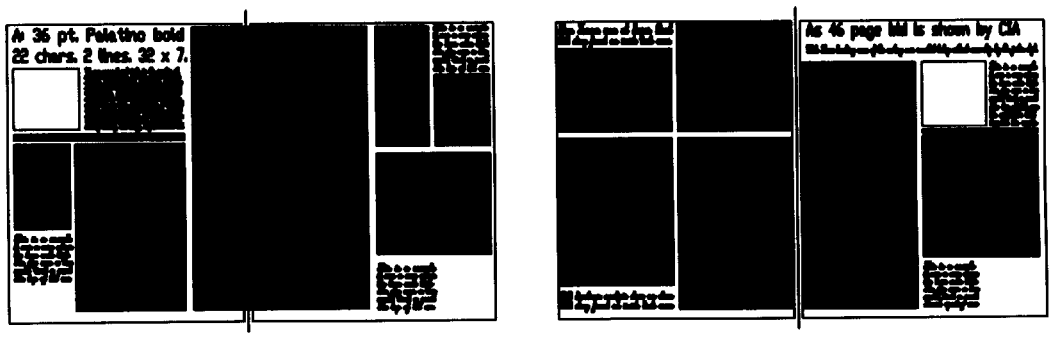
FIG. 16A illustrates a two consecutive templates, each template comprised of a two-page spread.
Figure 16B:
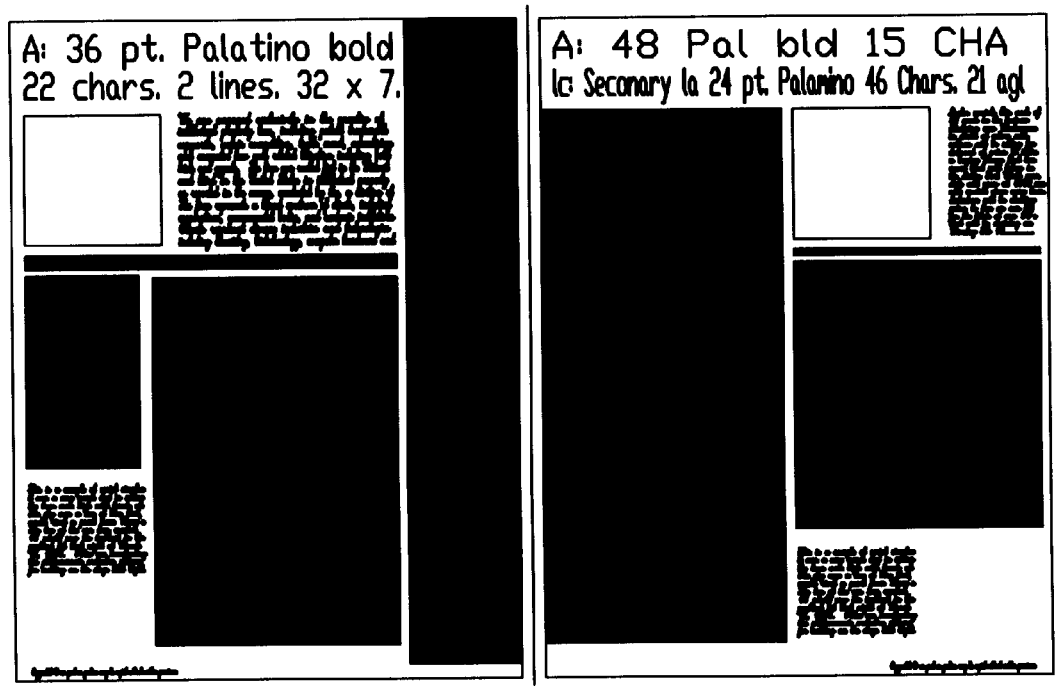
FIG. 16B illustrates a reformatted version of the two consecutive templates in FIG. 16A, wherein the second page of the first template and the first page of the second template have been deleted, and the first page of the first template has been merged with the second page of the second template to create a custom two-page spread.

The Fast Track Mix And Match utility allows an operator to mix and match left and right hand pages from any templates to create a custom two-page spread. FIG. 16A illustrates two consecutive templates, wherever each template is comprised of a two-page spread, and each two-page spread is comprised of graphics objects (in black), text objects, and picture objects (in white). FIG. 16B illustrates a reformatted version of the two consecutive templates in FIG. 16A, wherein the second page of the first template and the first page of the second template have been deleted, and the first page of the first template has been merged with the second page of the second template to create a custom two-page spread.

Figure 17:
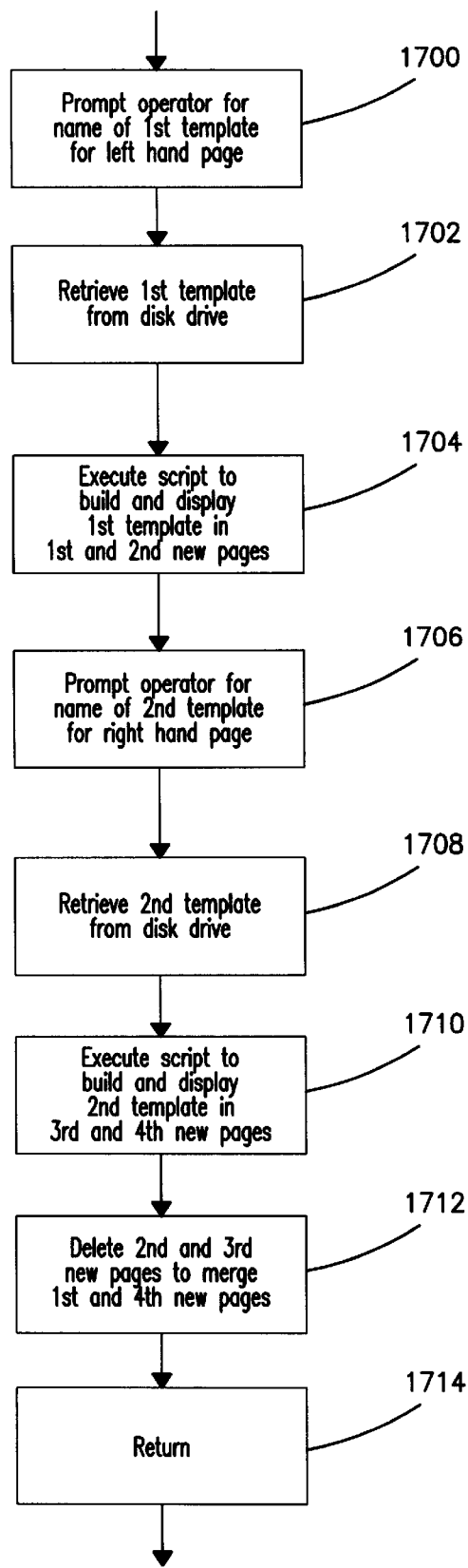
FIG. 17 is a flowchart that describes the logic of the Fast Track Mix And Match utility according to the present invention.

FIG. 17 is a flowchart that describes the logic of the Fast Track Mix And Match utility according to the present invention.

Block 1700 prompts the user to enter the template name from which to take the left hand page. Block 1702 retrieves the template, and block 1704 executes the script to build and display the two-page spread from the template.

Block 1706 prompts the user to enter the template name from which to take the right hand page. Block 1708 retrieves the template, and block 1710 executes the script to build and display the two-page spread from the template.

Block 1712 deletes the second and third pages of the 4 new pages, which telescopes the remaining pages, i.e., the first and fourth pages of the four new pages, thereby merging the selected left and right hand pages into a single two-page spread. Block 1714 terminates the utility and control is transferred to FIG. 2.

FRACTION CONVERSION

The Fraction Conversion utility allows an operator to correctly format text strings comprising fractions. FIG. 18A illustrates a text string containing a representation of a fraction in normal text. FIG. 18B illustrates a reformatted version of the text string in FIG. 18A, wherein the fraction has been reformatted.

Figure 19:
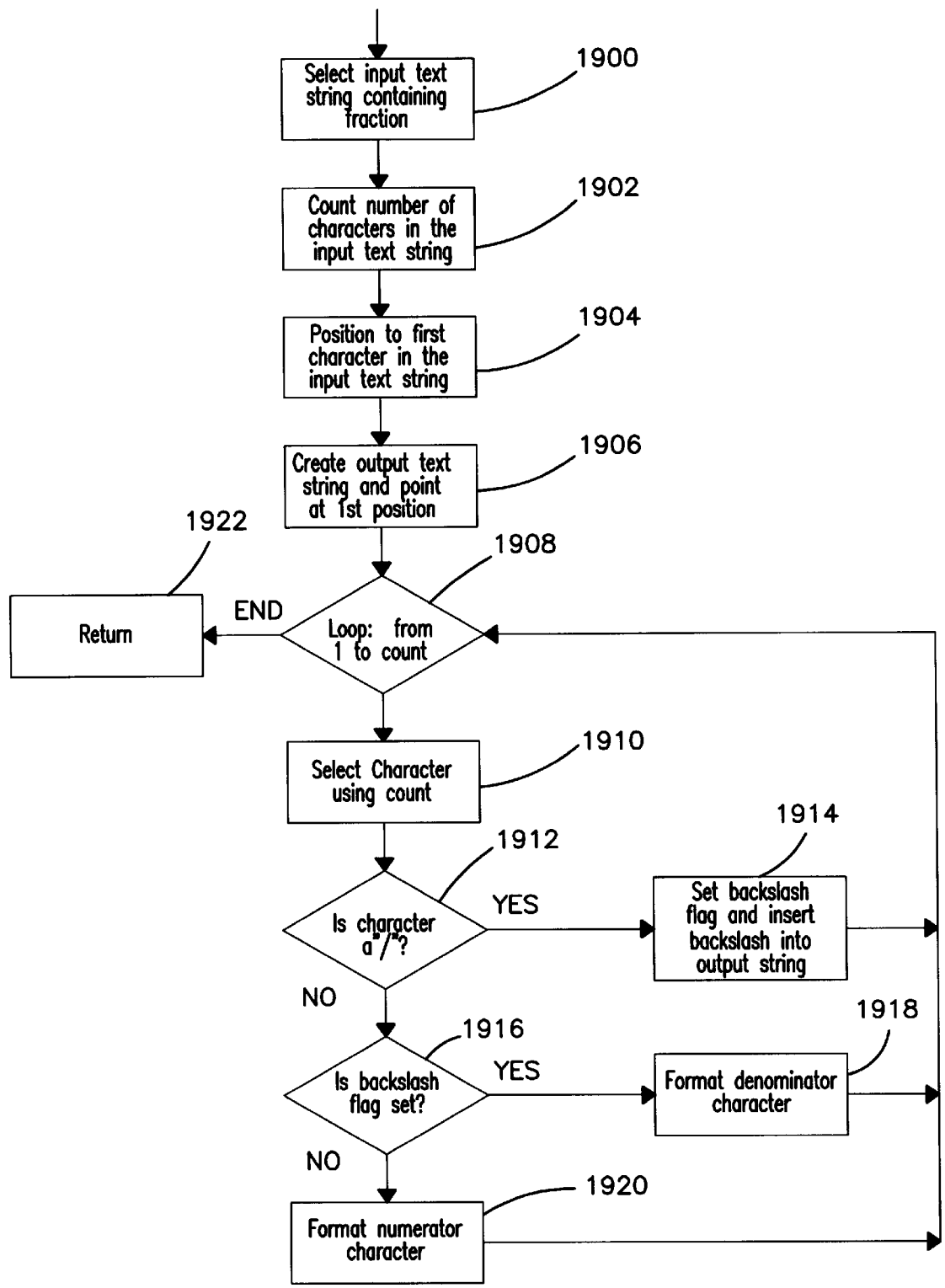
FIG. 19 is a flowchart that describes the logic of the Fraction Conversion utility according to the present invention.

FIG. 19 is a flowchart that describes the logic of the Fraction Conversion utility according to the present invention. Block 1900 represents the selection of the input text string containing the number to be converted, which is of the form: "235/350", since the desktop publishing system cannot actually display a proportional fraction. In the preferred embodiment, there is no limit to the number of digits in either the numerator or denominator of the fraction.

Block 1902 counts the number of total characters in the input text string, including the numerator, dividing line, and the denominator. Block 1904 positions to the first character in the input text string. Block 1906 creates an output string and points at the first position of the output string.

Block 1908 is a decision block that represents a sequential "for" loop that is executed once for each character in the input text string. Block 1908 transfers control to block 1910 as the first step of the loop for each character in the input text string. Otherwise, control is transferred to block 1912 after all the characters in the input text string have been processed in the loop.

Block 1910 selects the current character from the input text ring based on the loop counter. Block 1912 is a decision block that determines whether the character selected is a backslash or dividing line. If so, then block 1914 sets a flag to indicate that the backslash has been found, inserts the backslash into the output string, increments the output string pointer. Thereafter, control is transferred back to block 1908 to complete the loop. Otherwise, control is transferred to block 1916.

Block 1916 is a decision block that determines whether the backslash flag is set. If so, then control is transferred to block 1918; otherwise control is transferred to block 1920.

Block 1918 formats the denominator portion of the fraction by inserting the character into the current position of the output string as a subscript character, increments the output string pointer, and transfers control back to block 1908 to complete the loop.

Block 1920 formats the numerator portion of the fraction by inserting the character into the current position of the output string as a superscript character, increments the output string pointer, and transfers control back to block 1908 to complete the loop.

CONCLUSION

This concludes the description of the preferred embodiment of the invention. In summary, the present invention discloses a method and apparatus for manipulating page layouts in a desktop publishing system. The present invention comprises an interactive computer-implemented productivity tool that is fast and easy to use and enhances the productivity of operators of the desktop publishing system. Once a two-page spread has been laid out on the monitor of the desktop publishing system, the present invention provides a number of different methods for manipulating the spreads. For example, the present invention provides functions for: (1) rotating two-page spreads 180° and then re-rotating the contents of individual objects; (2) horizontally reflecting two-page spreads about a horizontal center line and then re-rotating the contents of individual objects; (3) vertically reflecting two-page spreads about a vertical center line and then re-rotating the contents of individual objects; (4) mirroring one page onto an opposite page; (5) automatically generates a selected number of columns while maintaining page margins; (6) executing scripts for fixed templates in order to build two-page scripts; (7) mirroring one page of a fixed template onto an opposite page that has been erased; (8) mixing and matching opposing pages from two templates to create a custom two-page spread; and (9) converting fractions to a more accurate textual representation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of manipulating page layouts in a computer, the page layouts being displayed on a monitor attached to the computer by a desktop publishing program, the method comprising the steps of:

(a) constructing one or more page layouts in the computer, each of the page layouts comprising one or more two-page spreads, and each of the two-page spreads containing once or more objects selected from a group comprising graphic objects, text objects, and picture objects;

(b) displaying one of the two-page spreads on the monitor attached to the computer;

(c) accepting an operator command into the computer that invokes a 180 degree rotation of the displayed two-page spread; and (d) in response to the accepted command, constructing a selection box around the displayed two-page spread, rotating the selection box 180 degrees about a center axis of the page layout so that all of the objects within the selection box are rotated 180 degrees, individually selecting all of the objects within the selection box, and counter-rotating the individually selected objects so that all of the objects within the selection box are correctly oriented.

2. A method of manipulating page layouts in a computer, the page layouts being displayed on a monitor attached to the computer by a desktop publishing program, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a horizontal reflection of the displayed two-page spread; and (d) in response to the accepted command constructing a selection box around The displayed two-page spread, horizontally reflecting the selection box about a horizontal center line of the two-page spread so that all of the objects within the selection box are horizontally reflected, individually selecting all of the objects within the selection box, and rotating the individually selected objects so that all of the objects within the selection box are correctly oriented.

3. A method of manipulating page layouts in a computer, the paste layouts being displayed on a monitor attached to the computer by a desktop publishing program, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a vertical reflection of the displayed two-page spread; and (d) in response to the accepted command, constructing a selection box around the displayed two-page spread, vertically reflecting the selection box about a vertical center line of the two-page spread so that all of the objects within the selection box are vertically reflected, individually selecting all of the objects within the selection box, and rotating the individually selected objects so that all of the objects within the selection box are correctly oriented.

4. A method of manipulating page layouts in a computer, the page layouts being displayed on a monitor attached to the computer by a desktop publishing program, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a mirror function for a selected one of the pages of the displayed two-page spread; and (d) in response to the accepted command, copying the selected page in the computer to create a copied page and pasting the copied page onto the selected page, vertically reflecting the copied page about a vertical center line of the two-page spread so that all of the objects within the copied page are vertically reflected, individually selecting all of the objects within the selection box, and rotating the individually selected objects so that all of the objects within the selection box are correctly oriented.

5. The method of claim 4 above, further comprising the steps of:

(1) prompting the operator for a desired template for the two-page spread and accepting an operator command into the computer that identifies the desired template;

(2) retrieving the desired template from a storage device attached to the computer and displaying the two-page spread on the monitor attached to the computer;

(3) accepting an operator command into the computer that identifies one of the pages of the displayed two-page spread for erasure; and (4) in response to the accepted operator command, erasing the identified page of the displayed two-page spread.

6. A method of manipulating page layouts in a computer, the page layouts being displayed on a monitor attached to the computer by a desktop publishing program the method comprising the steps of:

(a) prompting an operator for a first desired template for a first two-page spread, and accepting a first operator command into the computer that identifies the first desired template;

(b) retrieving the first desired template from a storage device attached to the computer in response to the accepted first operator command and displaying the first two-page spread on the monitor attached to the computer;

(c) prompting the operator for a second desired template for a second two-page spread, and accepting a second operator command into the computer that identifies the second desired template;

(d) retrieving the second desired template from a storage device attached to the computer in response to the accepted second operator command and displaying the second two-page spread on the monitor attached to the computer, wherein the second two-page spread is appended sequentially to the first two-page spread; and (e) deleting a second page of The first two-page spread and a first page of the second two-page spread to create a custom two-page spread by merging a first page of the first two-page spread with a second page of the second two-page spread.

7. An apparatus for manipulating page layouts, comprising:

(a) a computer;

(b) a desktop publishing program executed by the computer, the page layouts being displayed on a monitor attached to the computer by the desktop publishing program, wherein the desktop publishing program comprises:

(1) means for constructing one or more page layouts in the computer, each of the page layouts comprising one or more two-page spreads, and each of the two-page spreads containing one or more objects selected from a group comprising graphic objects, text objects, and picture objects;

(2) means for displaying one of the two-page spreads on the monitor attached to the computer;

(3) means for accepting an operator command into the computer that invokes a 180 degree rotation of the displayed two-page spread; and (4) means for constructing a selection box around the displayed two-page spread in response to the operator command, for rotating the selection box 180 degrees about a center axis of the page layout so that all of the objects within the selection box are rotated 180 degrees for individually selecting all of the objects within The selection box, and for counter-rotating the individually selected objects so that all of the objects within the selection box are correctly oriented.

8. An apparatus for manipulating page layouts, comprising:

(a) a computer;

(b) a desktop publishing program executed by the computer, the page layouts being displayed on a monitor attached to the computer by the desktop publishing program, wherein the desktop publishing program comprises:

(1) means for constructing one or more page layouts in the computer, each of the page layouts comprising one or more Two-page spreads, and each of the two-page spreads containing one or more objects selected from a group comprising graphic objects, text objects, and picture objects;

(2) means for displaying one of the two-page spreads on the monitor attached to the computer;

(3) means for accepting an operator command into the computer that invokes a horizontal reflection of the displayed two-page spread; and (4) means for constructing a selection box around the displayed two-page spread in response to the operator command, for horizontally reflecting the selection box about a horizontal center line of the two-page spread so that all of the objects within the selection box are horizontally reflected, for individually selecting all of the objects within the selection box, and for rotating the individually selected objects so that all of the objects within the selection box are correctly oriented.

9. An apparatus for manipulating page layouts, comprising:

(a) a computer;

(b) a desktop publishing program executed by the computer, the page layouts being displayed on a monitor attached to the computer by the desktop publishing program, wherein the desktop publishing program comprises:

(1) means for constructing one or more page layouts in the computer, each of the page layouts comprising one or more two-page spreads, and each of the two-page spreads containing one or more objects selected from a group comprising graphic objects, text objects, and picture objects;

(2) means for displaying one of the two-page spreads on the monitor attached to the computer;

(3) means for accepting an operator command into the computer that invokes a vertical reflection of the displayed two-page spread; and (4) means for constructing a selection box around the displayed two-page spread in response to the operator command, for vertically reflecting the selection box about a vertical center line of the two-page spread so that all of the objects within the selection box are vertically reflected, for individually selecting all of the objects within the selection box, and for rotating the individually selected objects so that all of the objects within the selection box are correctly oriented.

10. An apparatus for manipulating page layouts, comprising:

(a) a computer;

(b) a desktop publishing program executed by the computer, the page layouts being displayed on a monitor attached to the computer by the desktop publishing program, wherein the desktop publishing program comprises:

(1) means for constructing one or more page layouts in the computer, each of the page layouts comprising one or more two-page spreads, and each of the two-page spreads containing one or more objects selected from a group comprising graphic objects, text objects, and picture objects;

(2) means for displaying one of the two-page spreads on the monitor attached to the computer;

(3) means for accepting an operator command into the computer that invokes a mirror function for a selected one of The pages of the displayed two-page spread; and (4) means for copying the selected page in the computer to create a copied page in response to the operator command, for pasting the copied page onto the selected page, for vertically reflecting the copied page about a vertical center line of the two-page spread so that all of the objects within the copied page are vertically reflected, for individually selecting all of the objects within the selection box, and for rotating the individually selected objects so that all of the objects within the selection box are correctly oriented.

11. The apparatus for claim 10 above, further comprising:

means for prompting the operator for a desired template for the two-page spread, and for accepting an operator command into the computer that identifies the desired template;

means for retrieving the desired template from a storage device attached to the computer and for displaying the two-page spread on the monitor attached to the computer;

means for accepting an operator command into the computer that identifies one of the pages of the displayed two-page spread for erasure; and means for erasing the identified page of the displayed two-page spread in response to the operator command.

12. An apparatus for manipulating page layouts, comprising:

(a) a computer;

(b) a desktop publishing program executed by the computer, the page layouts being displayed on a monitor attached to the computer by the desktop publishing program, wherein the desktop publishing program comprises;

(1) means for prompting an operator for a first desired template for a first two-page spread, and accepting a first operator command into the computer that identifies the first desired template;

(2) means for retrieving the first desired template from a storage device attached to the computer in response to the accepted first operator command and for displaying the fist two-page spread on the monitor attached to the computer;

(3) means for prompting the operator for a second desired template for a second two-page spread and for accepting a second operator command into the computer that identifies the second desired template;

(4) means for retrieving the second desired template from a storage device attached to the computer in response to the accepted second operator command and for displaying the second two-page spread on the monitor attached to the computer, wherein the second two-page spread is appended sequentially to the first two-page spread; and (5) means for deleting a second page of the first two-page spread and a first page of the second two-page spread to create a custom two-page spread by merging a first page of the first two-page spread with a second page of the second two-page spread.

13. An article of manufacture embodying a desktop publishing program that when executed by a computer causes the computer to perform method steps for manipulating page layouts, the page layouts being displayed on a monitor attached to the computer, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a 180 degree rotation of the displayed two-page spread; and (d) in response to the accepted command, constructing a selection box around the displayed two-page spread in response to the operator command, rotating the selection box 180 degrees about a center axis of the page layout so that all of the objects within the selection box are rotated 180 degrees, individually selecting all of the objects within the selection box, and counter-rotating the individually selected objects so that all of tho objects within the selection box are correctly oriented.

14. An article of manufacture embodying a desktop publishing program that when executed by a computer causes the computer to perform method steps for manipulating page layouts, the page layouts being displayed on a monitor attached to the computer, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a horizontal reflection of the displayed two-page spread; and (d) in response to the accepted command, constructing a selection box around the displayed two-page spread, horizontally reflecting the selection box about a horizontal center line of the two-page spread so that all of the objects within the selection box are horizontally reflected, individually selecting all of the objects within the selection box, and rotating the individually selected objects so that all of the objects within the selection box are correctly oriented.

15. An article of manufacture embodying a desktop publishing program that when executed by a computer causes the computer to perform method steps for manipulating page layouts, the page layouts being displayed on a monitor attached to the computer, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a vertical reflection of the displayed two-page spread; and (d) in response to the accepted command, constructing a selection box around the displayed two-page spread in response to the operator command, vertically reflecting the selection box about a vertical center line of the two-page spread so that all of the objects within the selection box are vertically reflected, individually selecting all of the objects within the selection box, and rotating the individually selected objects so that all of the objects within the selection box are correctly oriented.

16. An article of manufacture embodying a desktop publishing program that when executed by a computer causes the computer to perform method steps for manipulating page layouts, The page layouts being displayed on a monitor attached to the computer, the method comprising the steps of:

(a) constructing one or more page layouts in the computer, each of the page layouts comprising one or more two-page spreads, and each of the two-page spreads containing one or more objects selected from a group comprising graphic objects, text objects, and picture objects;

(b) displaying one of the two-page spreads on the monitor attached to the computer;

(c) accepting an operator command into the computer that invokes a mirror function for a selected one of the pages of the displayed two-page spread; and (d) in response to the accepted command, copying the selected page in the computer to create a copied page and pasting the copied page onto the selected page, vertically reflecting the copied page about a vertical center line of the two-page spread so that all of the objects within the copied page are vertically reflected, individually selecting all of the objects within the selection box, and rotating the individually selected objects so that all of the objects within the selection box are correctly oriented.

17. The method of claim 16 above, further comprising the steps of:

(1) prompting the operator for a desired template for the two-page spread and accepting an operator command into the computer that identifies the desired template;

(2) retrieving the desired template from a storage device attached to the computer and displaying the two-page spread on the monitor attached to the computer;

(3) accepting an operator command into the computer that identifies one of the pages of the displayed two-page spread for erasure; and (4) in response to the accepted operator command, erasing the identified page of the displayed two-page spread.

18. An article of manufacture embodying a desktop publishing program that when executed by a computer causes the computer to perform method steps for manipulating page layouts, the page layouts being displayed on a monitor attached to the-computer, the method comprising the steps of:

(a) prompting an operator for a first desired template for a first two-page spread and accepting a first operator command into the computer that identifies the first desired template;

(b) retrieving the first desired template from a storage device attached to the computer in response to the accepted first operator command and displaying the first two-page spread on the monitor attached to the computer;

(c) prompting the operator for a second desired template for a second two-page spread, and accepting a second operator command into the computer that identifies the second desired template;

(d) retrieving the second desired template from a storage device attached to the computer in response to the accepted second operator command and displaying the second two-page spread on the monitor attached to the computer, wherein the second two-page spread is appended sequentially to the first two-page spread; and (e) deleting a second page of the first two-page spread and a first page of the second two-page spread to create a custom two-page spread by merging a first page of the first two-page spread with a second page of the second two-page spread.

* * * * *

UNITED STATES PATENT AND TRADEMARK OFFICE
CERTIFICATE OF CORRECTION

PATENT NO. : 5,900,002
DATED : May 4, 1999
INVENTOR(S) : Bottomly

It is certified that error appears in the above-identified patent and that said Letters Patent is hereby corrected as shown below:

Title page, [56] References Cited, U.S. Patent Documents: insert the following in appropriate order:

| | | | |
|---|---|---|---|
| — 5,271,065 | 12/1993 | Rourke et al. | 382/276 |
| 5,319,745 | 6/1994 | Vinsonneau et al. | 395/761 |
| 5,434,961 | 7/1995 | Horiuchi et al. | 395/761 |
| 5,459,826 | 10/1995 | Archibald | 395/779 |
| 5,517,621 | 5/1996 | Fukui et al. | 395/779 |
| 5,555,362 | 9/1996 | Yamashita et al. | 395/779— |

Title page, [References Cited], Other Publications: insert —Simpson, "Mastering WordPerfect 5.1 & 5.2 for Windows", *Sybex Inc.*, pp. 707–712, 1993.—

Col. 9, line 60: "once" should read —one—

Col. 11, line 53: "The" should read —the—

Col. 12, line 15: "The" should read —the—

Col. 12, line 30: "Two-page" should read —two-page—

Col. 8, line 61: "1912" should read —1922—

Signed and Sealed this

Sixteenth Day of January, 2001

*Attest:*

Q. TODD DICKINSON

*Attesting Officer*     Commissioner of Patents and Trademarks